(12) United States Patent
Ide et al.

(10) Patent No.: US 9,027,982 B2
(45) Date of Patent: May 12, 2015

(54) VEHICLE DOOR STRUCTURE

(75) Inventors: Toyoka Ide, Nissin (JP); Masayuki Okano, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 14/126,665

(22) PCT Filed: Jun. 23, 2011

(86) PCT No.: PCT/JP2011/064483
§ 371 (c)(1),
(2), (4) Date: Dec. 16, 2013

(87) PCT Pub. No.: WO2012/176324
PCT Pub. Date: Dec. 27, 2012

(65) Prior Publication Data
US 2014/0117704 A1  May 1, 2014

(51) Int. Cl.
*B60J 10/04* (2006.01)
*B60J 5/04* (2006.01)
*B60J 10/00* (2006.01)

(52) U.S. Cl.
CPC ............ *B60J 5/0402* (2013.01); *B60J 10/0094* (2013.01); *B60J 10/041* (2013.01); *B60J 10/0014* (2013.01)

(58) Field of Classification Search
CPC ..... B60J 10/041; B60J 10/042; B60J 10/0094
USPC ............. 296/146.2, 146.3, 93; 49/490.1, 502, 49/498.1; 454/121, 124
See application file for complete search history.

(56) References Cited

U.S. PATENT DOCUMENTS

| | | | |
|---|---|---|---|
| 5,473,125 A | 12/1995 | Stief et al. | |
| 5,775,030 A * | 7/1998 | Hamabata | 49/377 |
| 6,123,385 A | 9/2000 | Bailey et al. | |
| 6,135,874 A | 10/2000 | Weber | |
| 6,612,074 B1 * | 9/2003 | Kaye et al. | 49/441 |
| 6,837,005 B2 * | 1/2005 | Arata et al. | 49/440 |
| 2004/0094989 A1 * | 5/2004 | Matsumoto et al. | 296/146.1 |
| 2006/0079167 A1 | 4/2006 | Krause et al. | |
| 2007/0007788 A1 | 1/2007 | Araga et al. | |
| 2012/0091746 A1 * | 4/2012 | Zimmer et al. | 296/93 |
| 2013/0154302 A1 * | 6/2013 | Kim et al. | 296/93 |
| 2013/0320705 A1 * | 12/2013 | Okada et al. | 296/146.2 |

FOREIGN PATENT DOCUMENTS

| | | |
|---|---|---|
| DE | 2 228 061 | 12/1973 |
| DE | 198 12 489 C1 | 4/1999 |
| DE | 102 42 641 A1 | 3/2004 |

(Continued)

*Primary Examiner* — Jason S Morrow
(74) *Attorney, Agent, or Firm* — Oliff PLC

(57) ABSTRACT

A vehicle door structure that can improve an effect of insulating sounds that penetrate from a vehicle exterior into a vehicle cabin. A front side door to which a vehicle door structure is applied has, at a door main body that supports a door glass such that the door glass can be raised and lowered, a weatherstrip having a wall in which an opening is formed at a position facing the door glass, and a sealing lip that is disposed so as to project-out from the wall and slidingly contact the door glass. Further, a wall body that, together with the wall, forms a closed space that communicates with the opening is provided at a side of the wall opposite the door glass.

4 Claims, 31 Drawing Sheets

(56) References Cited

FOREIGN PATENT DOCUMENTS

| JP | A-07-020875 | 1/1995 |
| JP | A-2001-301469 | 10/2001 |
| JP | A-2006-142885 | 6/2006 |
| JP | A-2008-213607 | 9/2008 |
| JP | A-2010-149579 | 7/2010 |

* cited by examiner

VEHICLE DOOR STRUCTURE

TECHNICAL FIELD

The present invention relates to a vehicle door structure.

BACKGROUND ART

Patent Document 1 that is mentioned hereinafter discloses a structure in which an inner weatherstrip, that has two sealing lips that slidingly contact the inner surface of a door glass, is disposed at the vehicle inner side of the door glass at the interior of a side door.

[Patent Document 1] Japanese Patent Application Laid-Open No. 2010-149579

DISCLOSURE OF INVENTION

Technical Problem

In a case in accordance with aforementioned Patent Document 1, in order to decrease the sliding resistance of the door glass, the pressing force of the sealing lips against the door glass must be reduced. When the pressing force of the sealing lips against the door glass is set to be low, there is the possibility that the sound-insulating effect of insulating sounds that penetrate into the vehicle cabin from the vehicle exterior will deteriorate.

In consideration of the above-described circumstances, an object of the present invention is to provide a vehicle door structure that can improve the sound-insulating effect.

Solution to Problem

A vehicle door structure of a first aspect relating to the present invention is a structure comprising: a door main body that supports a door glass such that the door glass can be raised and lowered; a sealing member that is disposed at an upper portion of the door main body, and that has a wall that is disposed further toward a vehicle inner side than an outer wall surface that structures an outermost wall of a vehicle outer side of the door main body and that is disposed between the door glass and an upper end portion of a door panel provided at the door main body and in which an opening is formed at a position facing the door glass, and a sealing lip that is elastically deformable and is disposed so as to project out from the wall and slidingly contact the door glass; and a wall body that is disposed further toward a vehicle inner side than the outer wall surface that structures the outermost wall of the vehicle outer side of the door main body, and that is disposed between the door glass and the upper end portion of the door panel provided at the door main body, and that, together with the wall, forms a closed space that communicates with the opening at a side of the wall opposite from the door glass.

A vehicle door structure of a second aspect relating to the present invention is a structure in which, in the vehicle door structure of the first aspect, the sealing member has at least two sealing lips that are disposed in parallel at vehicle upper and lower sides, and the opening is provided between the sealing lips that are adjacent.

A vehicle door structure of a third aspect relating to the present invention is a structure in which, in the vehicle door structure of the first aspect or the second aspect, the sealing member is an inner weatherstrip that is fit-together with an upper end portion of a door inner panel that structures a vehicle inner side member of the door main body, and the wall body is molded integrally with the inner weatherstrip.

A vehicle door structure of a fourth aspect relating to the present invention is a structure in which, in the vehicle door structure of any one aspect of the first aspect through the third aspect, a canopy, that projects out from the wall toward the door glass side and is inclined toward a vehicle lower side from the wall in a projecting-out direction, is provided at an upper portion, in a vehicle vertical direction, of the opening at the wall.

A vehicle door structure of a fifth aspect relating to the present invention is a structure in which, in the vehicle door structure of any one aspect of the first aspect through the fourth aspect, at least one partitioning wall that divides the closed space is provided at the wall body, and another opening is formed in the partitioning wall.

In accordance with the vehicle door structure of the first aspect relating to the present invention, the wall, that is disposed further toward the vehicle inner side than an outer wall surface that structures the outermost wall of the vehicle outer side of the door main body and that is disposed between the door glass and the upper end portion of the door panel provided at the door main body and in which an opening is formed at a position facing the door glass, and a sealing lip, that projects out from the wall, are provided at the sealing member that is disposed at the upper portion of the door main body, and the sealing lip slidingly contacts the door glass. The wall body, that is disposed between the door glass and the upper end portion of the door panel provided at the door main body and that, together with the wall of the sealing member, forms a closed space that communicates with the opening of the sealing member, is provided at a side of the wall of the sealing member opposite from the door glass. The wall body, that forms the closed space that communicates with the opening of the sealing member, is disposed further toward the vehicle inner side than the outer wall surface that structures the outermost wall of the vehicle outer side of the door main body. Due thereto, there becomes a spring-mass system in which the air at the opening portion is a mass and the closed space at the rear of the opening is a spring, and, when sound of a specific frequency hits, the air at the opening portion vibrates markedly. Due thereto, the energy of the sound changes into vibration energy, and moreover, due to the vibration energy changing into thermal energy due to the viscous resistance and friction of the air, the sound is reduced. Therefore, sound of a specific frequency can be reduced, and the sound insulating effect can be improved.

In accordance with the vehicle door structure of the second aspect relating to the present invention, the sealing member has at least two sealing lips that are disposed in parallel at vehicle upper and lower sides, and the opening is provided at the wall between sealing lips that are adjacent. Due thereto, a spring-mass system, that is formed by the opening and the closed space of the wall body at the rear of the opening, is added to the spring-mass system that is formed from the two sealing lips. Due thereto, it is possible to increase the frequency range in which sound is reduced, and the sound-insulating effect can be improved more reliably.

In accordance with the vehicle door structure of the third aspect relating to the present invention, the sealing member is an inner weatherstrip that is fit-together with the upper end portion of a door inner panel that structures a vehicle inner side member of the door main body, and the wall body, that forms the closed space, is molded integrally with the inner weatherstrip. Due thereto, the wall body, that has the closed space that communicates with the opening, can be formed easily at the inner weatherstrip.

In accordance with the vehicle door structure of the fourth aspect relating to the present invention, the canopy that projects out from the wall toward the door glass side is provided at the upper portion, in the vehicle vertical direction, of the opening at the wall of the sealing member. The canopy is provided so as to be inclined toward the vehicle lower side from the wall in the projecting-out direction. When water droplets are generated due to condensation or the like at the inner surface of the door glass, the water, that has been transmitted-in along the wall of the sealing member from the vehicle upper side, is blocked by the canopy. Therefore, water flowing from the opening into the closed space at the interior of the wall body can be suppressed.

In accordance with the vehicle door structure of the fifth aspect relating to the present invention, at least one partitioning wall that divides the closed space is provided at the wall body. By forming another opening at the partitioning wall, a spring-mass system, that is formed by the other opening of the partitioning wall and the space at the rear of the other opening, is added to the spring-mass system that is formed by the opening that is formed in the wall and the space at the rear of the opening. Due thereto, it is possible to increase the frequency range in which sound is reduced, and the sound-insulating effect can be improved more effectively.

Advantageous Effects of Invention

In accordance with the vehicle door structure relating to the present invention, the sound-insulating effect can be improved.

BEST MODES FOR CARRYING OUT THE INVENTION

A first embodiment of a vehicle door structure relating to the present invention is described hereinafter by using FIG. 1 through FIG. 8. Note that arrow FR that is shown appropriately in these drawings indicates the vehicle front side, arrow UP indicates the vehicle upper side, and arrow OUT indicates the vehicle transverse direction outer side.

Figure 1:
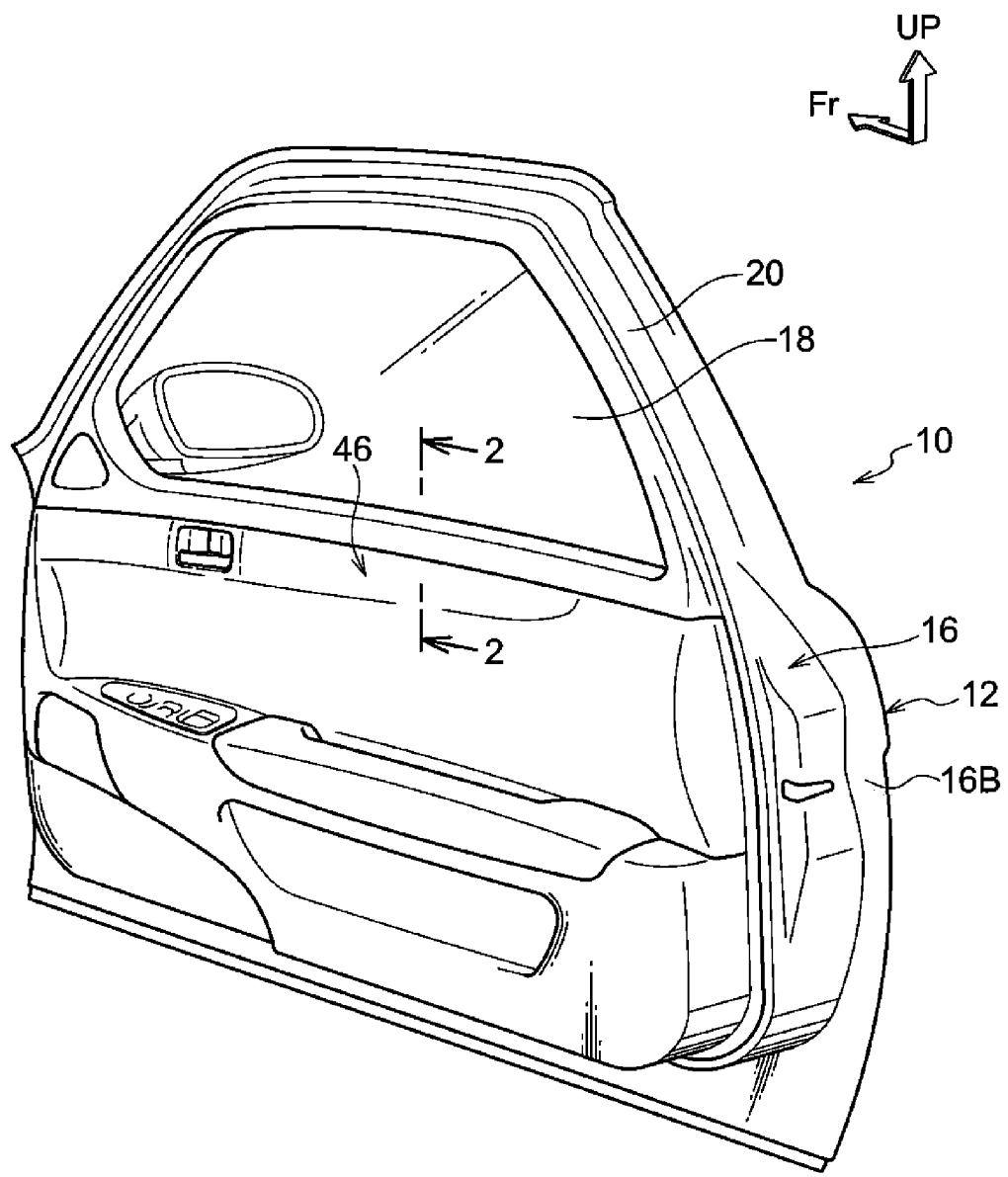
FIG. 1 is a structural drawing showing a vehicle inner side of a front side door to which a vehicle door structure relating to a first embodiment is applied.
Figure 2:
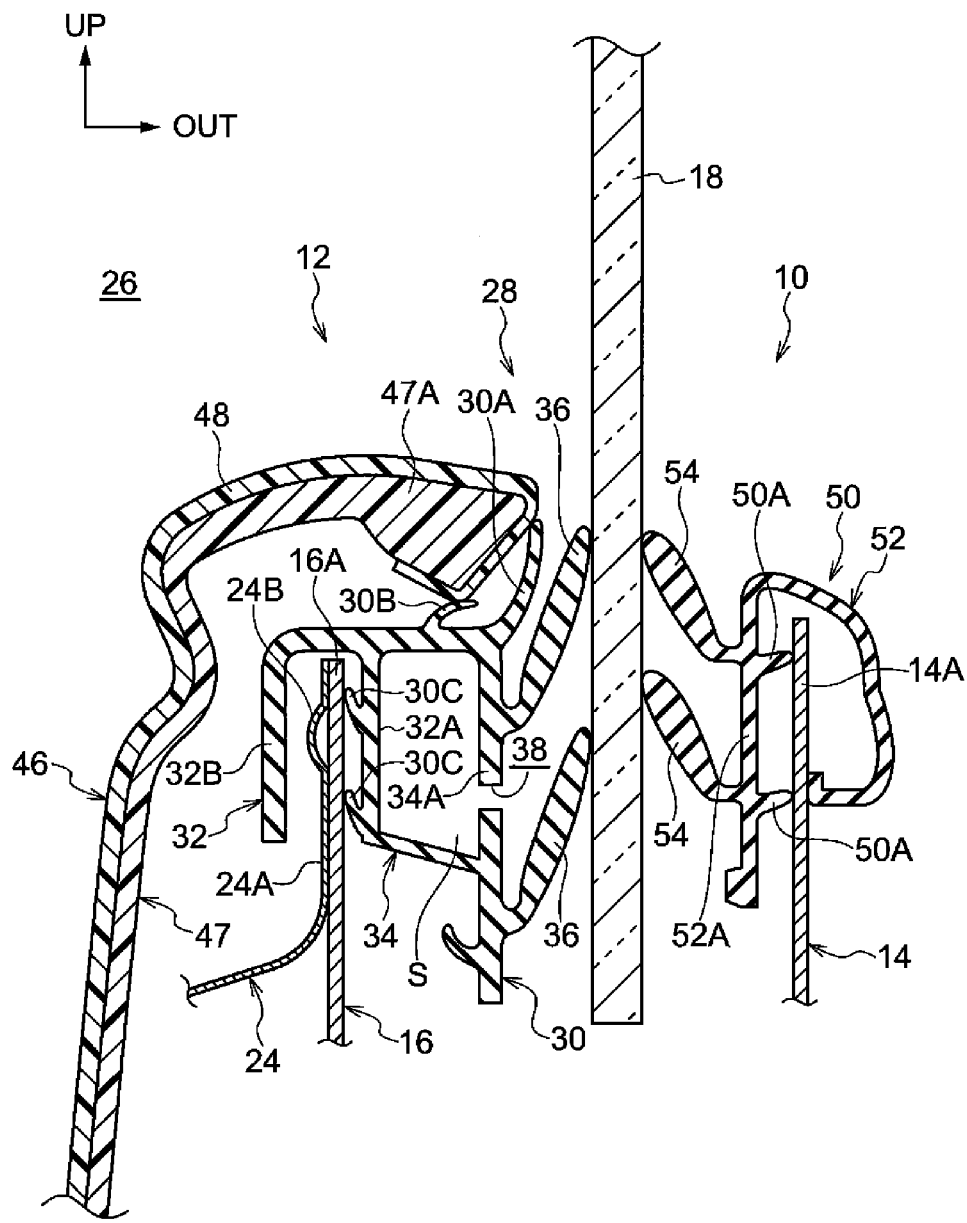
FIG. 2 is a vertical sectional view showing the structure of the vehicle door structure along line 2-2 of FIG. 1.

A front side door, to which the vehicle door structure relating to the present embodiment is applied, is shown in FIG. 1 in a state of being viewed from the vehicle inner side. Further, a vertical sectional view of the front side door along line 2-2 in FIG. 1 is shown in FIG. 2. As shown in these drawings, a front side door 10 that serves as a vehicle door is provided at the side portion (not shown) of a vehicle. The front side door 10 is mounted, so as to be able to open and close, to a front door opening portion (not illustrated) that is provided in the side portion of the vehicle. The front side door 10 has a door main body 12 that is structured to include a door outer panel 14, that is disposed at the vehicle transverse direction outer side, and a door inner panel 16, that is disposed at the vehicle transverse direction inner side. The door outer panel 14 and the door inner panel 16 are formed in a closed cross-sectional structure due to the end edge portion, other than an upper edge portion 14A, of the door outer panel 14 being made integral by hemming processing with an end edge portion 16B, other than an upper edge portion 16A, of the door inner panel 16. A vehicle door structure 28 of the present embodiment is applied to the front side door 10.

Further, the front side door 10 has a door glass (side door glass) 18 that is inserted into the interior of the door main body 12 (between the door outer panel 14 and the door inner panel 16) from the gap between the opposing portions of the upper edge portion 14A of the door outer panel 14 and the upper edge portion 16A of the door inner panel 16, and is disposed so as to be able to be raised and lowered in the vehicle vertical direction. A door frame 20, for guiding the door glass 18 at times of being raised and lowered, is mounted in the shape of a gate as seen from the vehicle side surface to the vehicle upper portion side of the door main body 12. Namely, the door main body 12 supports the door glass 18, that is disposed at the inner side of the door frame 20 as seen from the vehicle side surface, such that the door glass 18 can be raised and lowered.

As shown in FIG. 2, a door inner reinforcement 24 is disposed at the vehicle transverse direction inner side of the upper portion of the door inner panel 16. The upper edge portion 16A of the door inner panel 16 and a vertical wall portion 24A, that is formed at the upper end of the door inner reinforcement 24, are joined by welding or the like in a planarly-contacting state. A projecting portion 24B, that is shaped as a curved surface and that projects-out toward the vehicle transverse direction inner side, is formed at the vehicle vertical direction intermediate portion of the vertical wall portion 24A of the door inner reinforcement 24.

Figure 4:
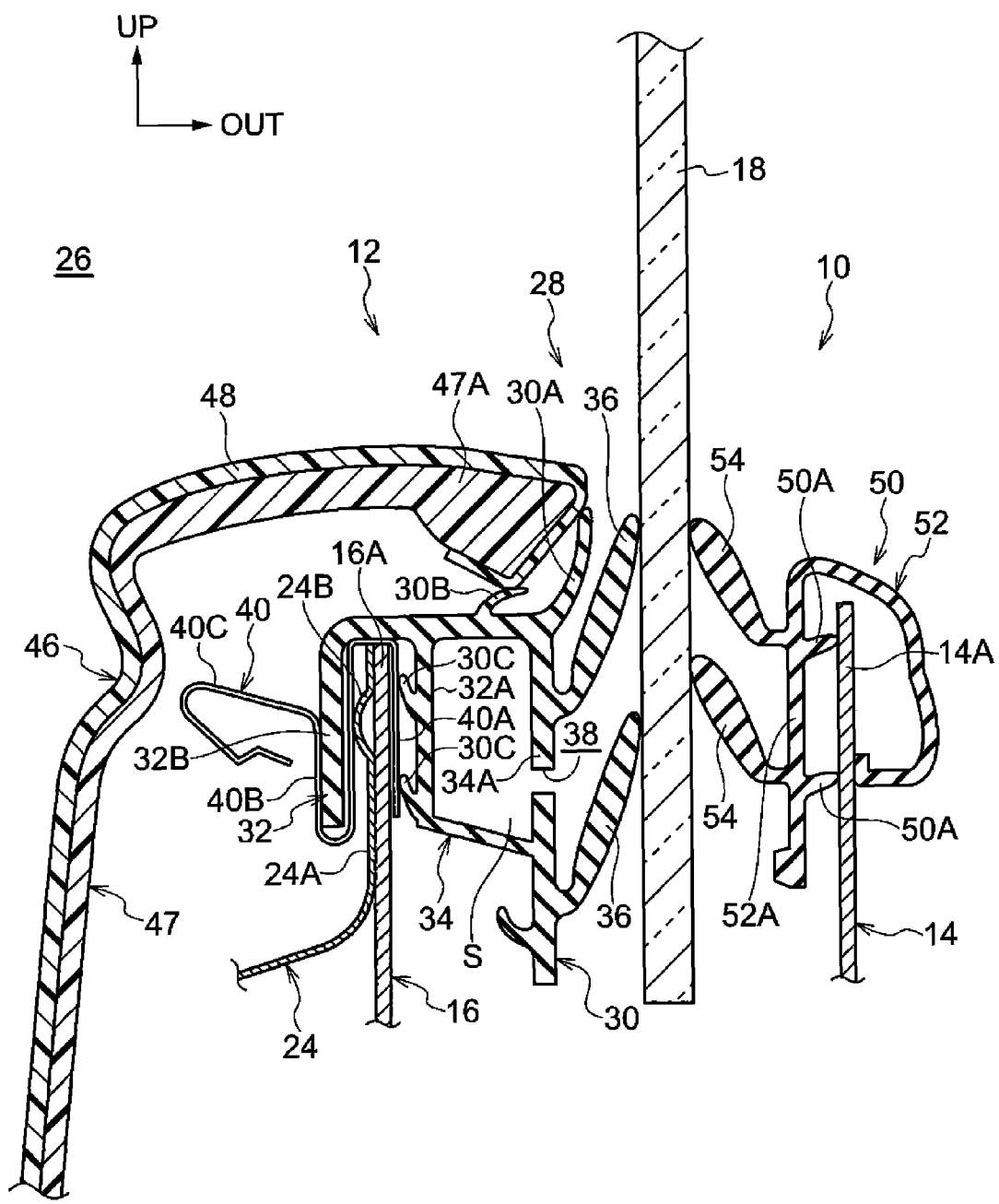
FIG. 4 is a vertical sectional view showing a state in which the inner weatherstrip shown in FIG. 2 is mounted to an inner panel by a clip.
Figure 5:
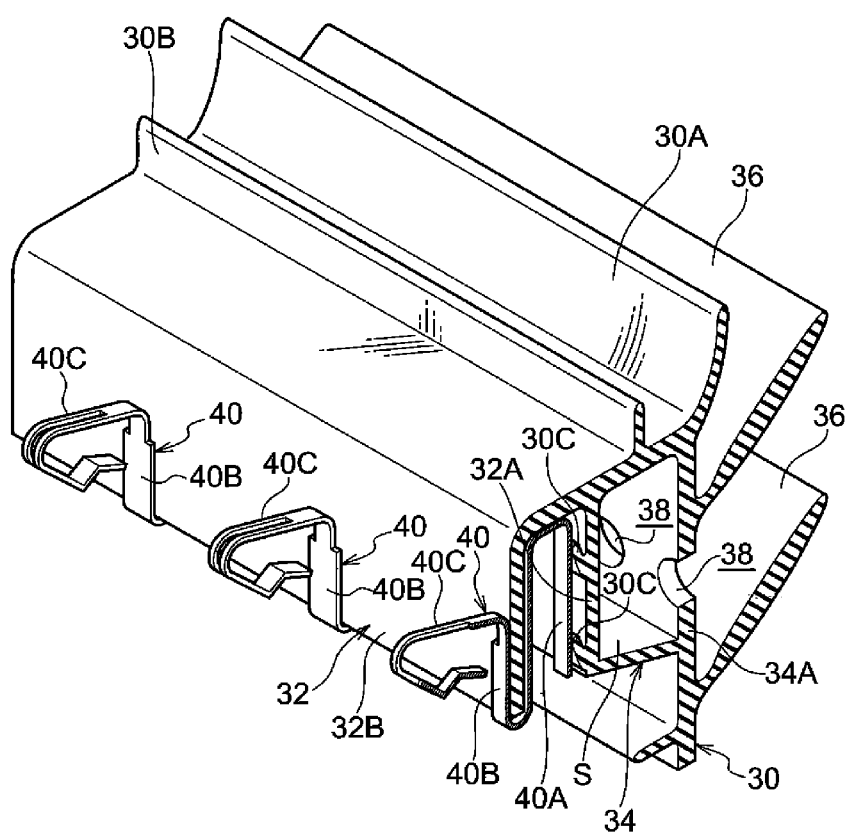
FIG. 5 is a perspective view showing a state in which the clips are provided at the inner weatherstrip.

As shown in FIG. 2, FIG. 4 and FIG. 5, at the vehicle door structure 28, an inner weatherstrip 30 that serves as an example of a sealing member is mounted by plural clips 40 to the joined portion of the upper edge portion 16A of the door inner panel 16 and the vertical wall portion 24A of the door inner reinforcement 24. Further, a door trim 46 is mounted to the vehicle transverse direction inner side (a vehicle cabin 26 side) of the door main body 12 so as to cover the vehicle inner side surfaces of the door inner panel 16 and the door inner reinforcement 24 from the upper end portions of the door inner panel 16 and the door inner reinforcement 24 and the inner weatherstrip 30.

The clip 40 is made of metal, and has a nipping portion 40A whose cross-section is substantially U-shaped and that opens toward the vehicle lower side. The nipping portion 40A of the clip 40 is formed from a plate spring that is elastically deformable in a direction intersecting the upper edge portion 16A of the door inner panel 16, and the nipping portion 40A is fit-in from the vehicle upper side of the joined portion of the upper edge portion 16A of the door inner panel 16 and the vertical wall portion 24A of the door inner reinforcement 24. Further, a bent portion 40B, whose cross-section is substantially U-shaped and that opens toward the vehicle upper side, is formed at the wall portion at the vehicle inner side of the nipping portion 40A of the clip 40 so as to be continuous with this wall portion at the vehicle inner side. A vertical wall 32B at the vehicle inner side of a mounting portion 32 of the inner weatherstrip 30 that is described later is inserted in the bent portion 40B. At this time, due to the vertical wall 32B of the inner weatherstrip 30 pushing the wall portion at the vehicle inner side of the nipping portion 40A in the direction of abutting the projecting portion 24B of the vertical wall portion 24A, the nipping portion 40A of the clip 40 is fixed to the joined portion of the upper edge portion 16A of the door inner panel 16 and the vertical wall portion 24A of the door inner reinforcement 24. Further, a bent portion 40C, that is bent so as to project-out toward the vehicle inner side, is formed at the upper end portion of the vehicle inner side of the bent portion 40B of the clip 40. An engaging portion is formed at the distal end of the bent portion 40C, and an opening portion (not illustrated) that is formed in the door trim 46 is engaged.

Figure 3:
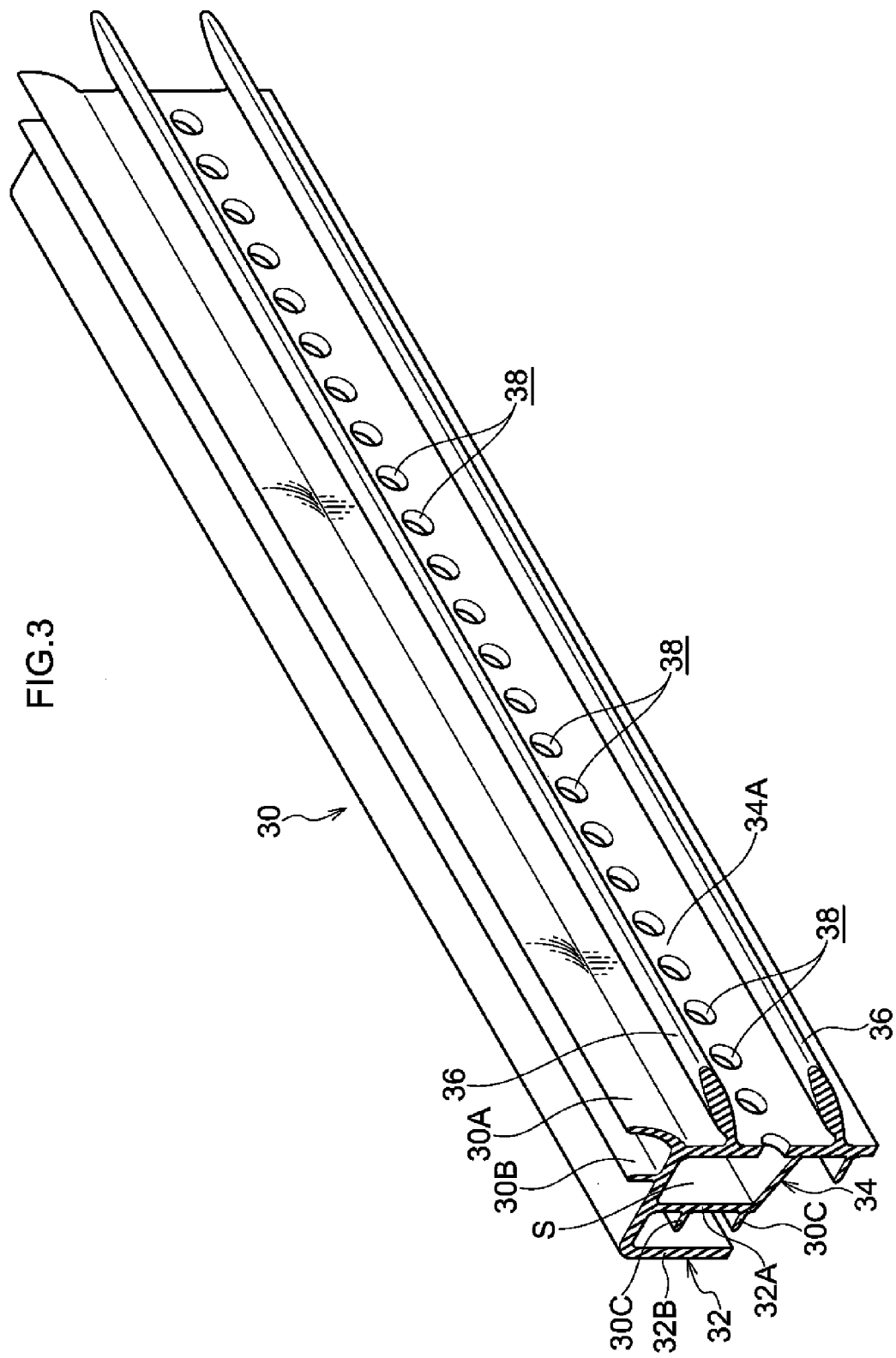
FIG. 3 is a perspective view showing an inner weatherstrip that is used in the vehicle door structure relating to the first embodiment.

As shown in FIG. 2 through FIG. 4, the inner weatherstrip 30 is an elongated member that is provided along the vehicle longitudinal direction at the upper portion of the door inner panel 16. The inner weatherstrip 30 has the mounting portion 32 whose cross-section is substantially U-shaped and in which an opening is formed at the vehicle lower side, a wall body 34 that, together with a vertical wall 32A at the vehicle outer side of the mounting portion 32, forms a closed space S that is substantially rectangular, two sealing lips 36 that extend so as to project-out toward the door glass 18 side from a vertical wall (wall) 34A that forms the wall at the vehicle outer side of the wall body 34, and through-holes 38 that serve as examples of an opening and that are formed in the vertical wall 34A between the two sealing lips 36.

The mounting portion 32 of the inner weatherstrip 30 is mounted to the joined portion of the upper edge portion 16A of the door inner panel 16 and the vertical wall portion 24A of the door inner reinforcement 24, by the clips 40 in a state of being inserted onto the exterior of the nipping portions 40A of the clips 40.

The vertical wall (wall) 34A of the wall body 34 is disposed so as to face the door glass 18, in the state in which the mounting portion 32 of the inner weatherstrip 30 is mounted to the joined portion of the upper edge portion 16A of the door inner panel 16 and the vertical wall portion 24A of the door inner reinforcement 24. The two sealing lips 36 are formed in parallel at the vehicle upper and lower sides at the vertical wall 34A. The vertical wall 34A and the two sealing lips 36 are disposed along the vehicle longitudinal direction of the door main body 12. The two sealing lips 36 extend in a direction intersecting the locus on which the door glass 18 is raised and lowered, and the distal ends of the two sealing lips 36 are directed toward the vehicle diagonally upper side with respect to the wall surface of the vertical wall 34A. The two sealing lips 36 can elastically deform in a direction intersecting the direction in which the distal ends thereof extend. Further, the sealability with the door glass 18 is ensured due to the distal ends of the sealing lips 36 slidingly contacting the door glass 18.

The through-holes (openings) 38 are formed in a vicinity of the sealing lips 36 at positions, that face the door glass 18, of the vertical wall 34A. In the present embodiment, as seen from the vehicle side surface, the through-holes 38 are provided at a position that overlaps the distal end portion of the sealing lip 36 that is at the vehicle lower side. Further, the plural through-holes 38 are formed along the longitudinal direction of the vertical wall 34A (the vehicle longitudinal direction) between the two sealing lips 36 (see FIG. 3). In the present embodiment, the plural through-holes 38 are made to be circular shapes of substantially the same size. The wall body 34, that communicates with the through-holes 38 and forms the closed space S, is provided at the side of the vertical wall 34A opposite the door glass 18, and the vertical wall 34A is formed integrally with the wall body 34. In other words, the wall body 34, that forms the closed space S, is disposed at the rear of the through-holes 38 of the vertical wall 34A, with respect to the door glass 18. The wall body 34 that forms the closed space S is disposed along the vehicle longitudinal direction at the vehicle transverse direction outer side of the door inner panel 16 at the interior of the door main body 12 (see FIG. 3).

In the present embodiment, the mounting portion 32 and the wall body 34 and the two sealing lips 36 of the inner weatherstrip 30 are molded integrally from an elastic member of rubber or resin or the like (in the present embodiment, rubber). In the present embodiment, the inner weatherstrip 30 is formed by extrusion molding. Due thereto, the wall body 34, that has the closed space S that communicates with the through-holes 38, can be formed easily at the inner weatherstrip 30. Further, two projecting pieces 30A, 30B that abut the door trim 46 are formed at the upper portion of the wall body 34 of the inner weatherstrip 30, and two projecting pieces 30C that abut the clips 40 and the door inner panel 16 are formed at the vehicle inner side of the vertical wall 32A of the mounting portion 32.

An upper end portion 47A of a base material 47 of the door trim 46 is disposed so as to circle-in from the vehicle upper side of the inner weatherstrip 30 toward the vehicle transverse direction inner side. A skin 48 is provided at the door trim 46 so as to cover the upper surface and the side surface portion at the outer side in the vehicle transverse direction of the base material 47. Due to the projecting pieces 30A, 30B of the inner weatherstrip 30 abutting the reverse surface side of the door trim 46, the sealability of the inner weatherstrip 30 and the door trim 46 is ensured. Further, due to the projecting pieces 30C of the inner weatherstrip 30 abutting the door inner panel 16 and the clips 40, the sealability of the inner weatherstrip 30 and the door inner panel 16 is ensured.

As shown in FIG. 2 and FIG. 4, a belt molding 50, that is made of rubber or resin and that is disposed along the vehicle longitudinal direction of the door main body 12, is mounted to the upper edge portion 14A of the door outer panel 14. The belt molding 50 has a mounting portion 52 that opens toward the vehicle lower side and that is fit into the upper edge portion 14A of the door outer panel 14, and two sealing lips 54 that project-out toward the door glass 18 side from a vertical wall 52A at the vehicle inner side that structures the mounting portion 52. The two sealing lips 54 are disposed in parallel at the vehicle upper and lower sides. The two sealing lips 54 extend in a direction intersecting the locus on which the door glass 18 is raised and lowered, and, due to the distal ends of the sealing lips 54 slidingly contacting the door glass 18, the sealability with the door glass 18 is ensured.

At the belt molding 50, two projecting pieces 50A that abut the door outer panel 14 are formed at the vehicle outer side of the vertical wall 52A of the mounting portion 52. Due to the projecting pieces 50A abutting the door outer panel 14, the sealability of the belt molding 50 and the door outer panel 14 is ensured.

Figure 6:
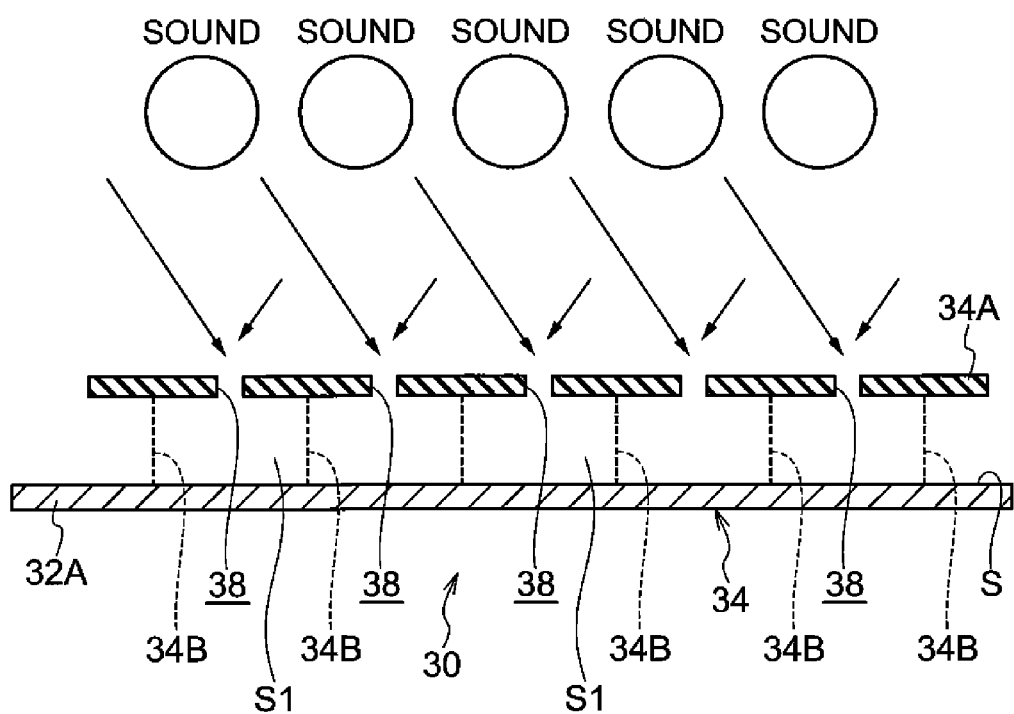
FIG. 6 is a lateral sectional view showing a wall, in which through-holes are formed, and a wall body, that forms a closed space that communicates with the through-holes, at the inner weatherstrip.

The wall body 34 of the inner weatherstrip 30 is shown in FIG. 6 in a lateral sectional view along the vehicle longitudinal direction. As shown in FIG. 6, the plural through-holes 38 are formed along the longitudinal direction of the inner weatherstrip 30, in the vertical wall 34A, that faces the door glass 18 (see FIG. 2), at the wall body 34. The wall body 34, that forms the closed space S that communicates with the plural through-holes 38, is provided at the side of the vertical wall 34A opposite the door glass 18. Virtual walls 34B, that are orthogonal to the vertical wall 34A and that divide the wall body 34 interior, are disposed at the interior of the wall body 34 between the adjacent through-holes 38. Due to these virtual walls 34B, spaces S1, that communicate with the respective through-holes 38 respectively, are formed at the rear of the vertical wall 34A (the side opposite the door glass 18).

Figure 7:
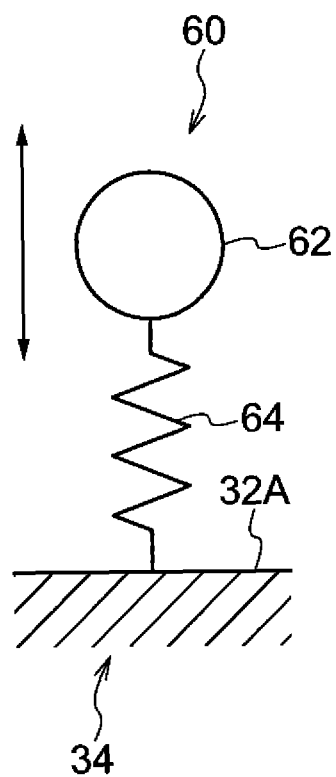
FIG. 7 is a drawing showing a spring-mass system that is formed by the through-hole shown in FIG. 6 and the closed space at the rear thereof.

As shown in FIG. 6 and FIG. 7, a spring-mass system 60, that has one degree of freedom and in which the air at the through-hole 38 portion is a mass 62 and the space S1 formed by the virtual walls 34B and the wall body 34 at the rear of the vertical wall 34A is a spring 64, is structured at this inner weatherstrip 30. In this spring-mass system 60 of one degree of freedom, when sound of a specific frequency hits the mass 62 of air at the through-hole 38 portion, the mass 62 vibrates severely in the expanding/contracting direction of the spring 64 (the direction that is orthogonal to the vertical wall 32A of the wall body 34 and is shown by the arrow). Due thereto, the energy of the sound changes into vibration energy, and further, due to the vibration energy changing into thermal energy due to the viscous resistance and friction of the air, sound of the specific frequency is reduced markedly.

Here, given that the length of the through-hole 38 is l, the surface area of the through-hole 38 is S, the volume of the space S1 at the rear of the through-hole 38 is V, and the speed of sound is c, the reduction frequency f of the sound is expressed by the following formula.

$$f = \frac{c}{2\pi} \sqrt{\frac{S}{(l + \Delta l)V}}$$ [Numerical Expression 1]

Figure 8:
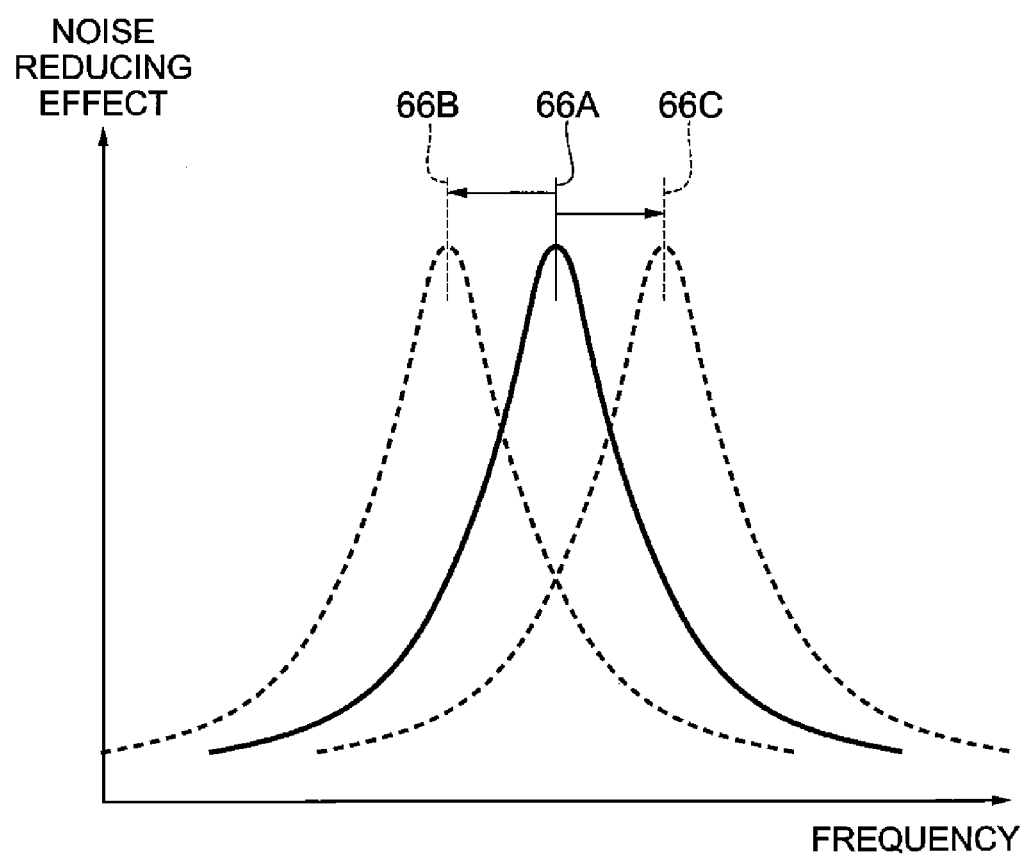
FIG. 8 is a graph showing the relationship between frequency and sound reducing effect.

As shown by this formula, the frequency at which the sound reducing effect appears is determined by the size of the through-hole 38 and the volume (capacity) of the space S1 at the rear of the through-hole 38. As shown in FIG. 8, because there is the spring-mass system 60 of one degree of freedom, sound is markedly reduced when the spring-mass system 60 resonates (is markedly reduced at the specific frequency). Further, as shown in FIG. 8, by changing the size of the through-hole 38 and the volume (capacity) of the space S1 at the rear of the through-hole 38, frequencies 66A, 66B, 66C at which a sound reducing effect appears are varied.

Figure 9:
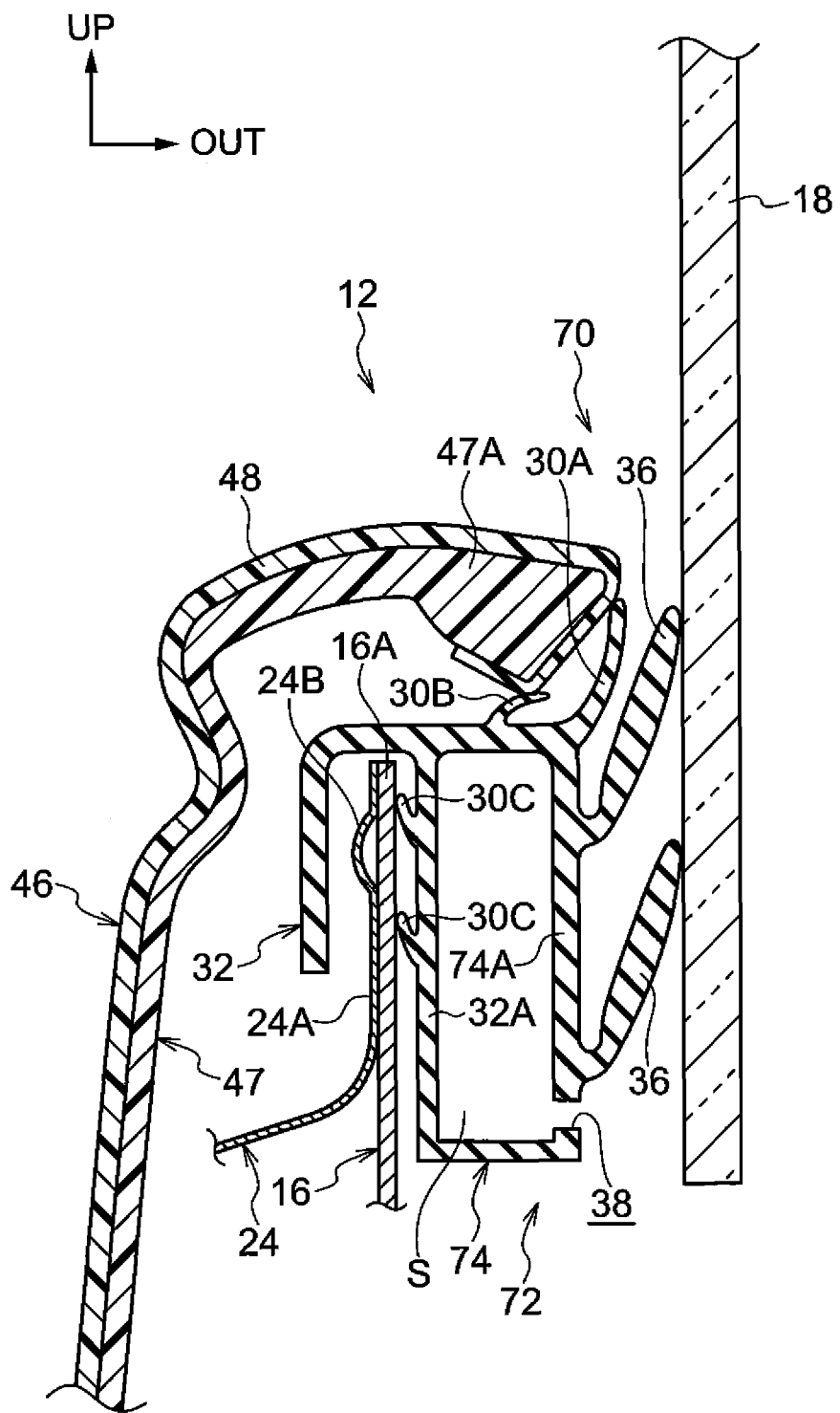
FIG. 9 is a vertical sectional view showing the structure of a vehicle door structure relating to a first modified example.

A vehicle door structure 70 relating to a first modified example is shown in FIG. 9. Note that the same structural portions as the first embodiment are denoted by the same numbers, and description thereof is omitted.

As shown in FIG. 9, at an inner weatherstrip 72 to which the vehicle door structure 70 is applied, a wall body 74, that forms the closed space S that is larger than that of the wall body 34 of the first embodiment (see FIG. 2), is formed integrally with a vertical wall 74A at the reverse surface side of the vertical wall 74A that faces the door glass 18. The two sealing lips 36 are provided at this inner weatherstrip 72, and the through-holes 38 are formed in the vertical wall 74A in a vicinity of the lower side of the sealing lip 36 that is at the lower side.

Figure 10:
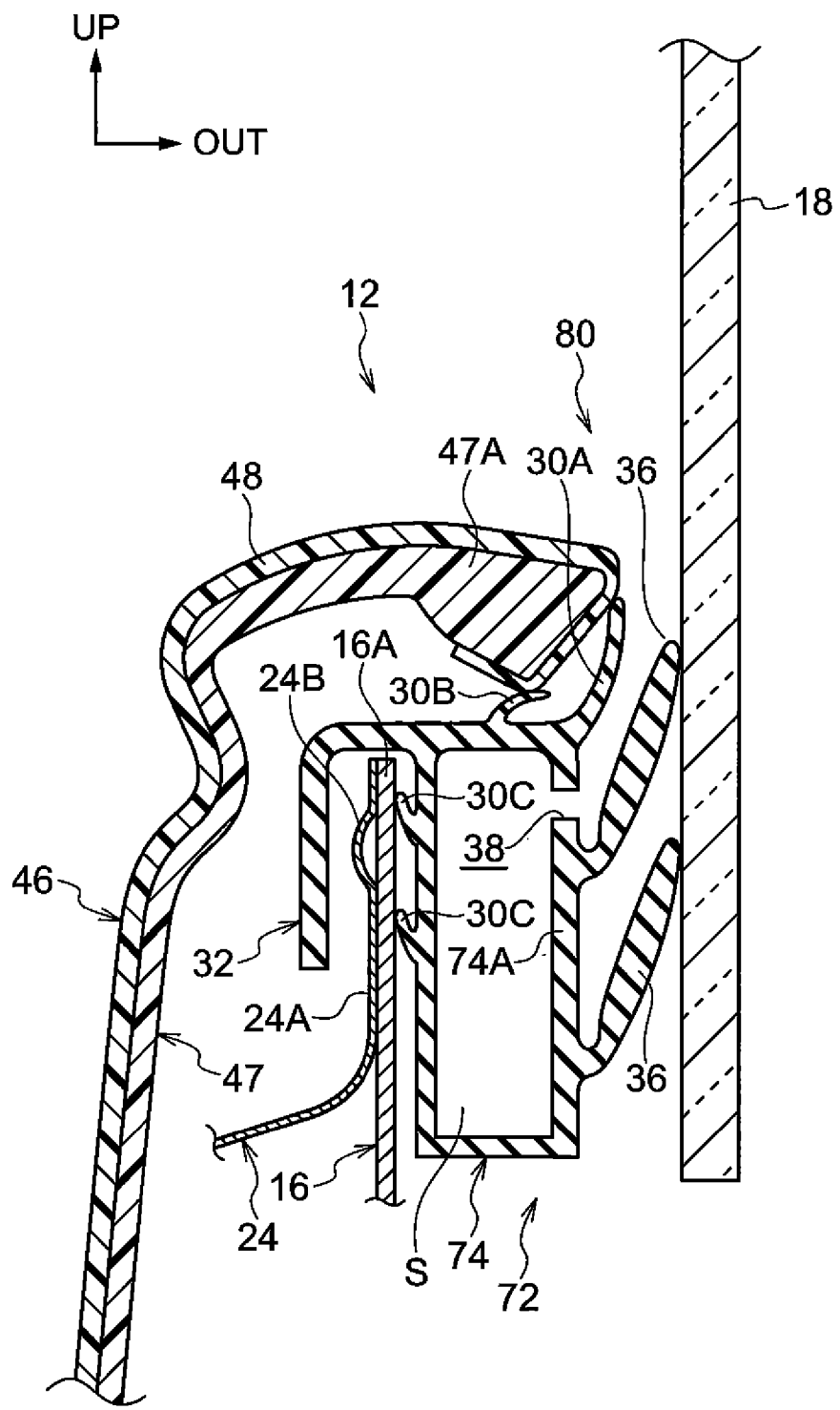
FIG. 10 is a vertical sectional view showing the structure of a vehicle door structure relating to a second modified example.

A vehicle door structure 80 relating to a second modified example is shown in FIG. 10. Note that the same structural portions as the first embodiment are denoted by the same numbers, and description thereof is omitted.

As shown in FIG. 10, at an inner weatherstrip 82 to which the vehicle door structure 80 is applied, the wall body 74, that forms the closed space S that is larger than that of the wall body 34 of the first embodiment (see FIG. 2), is formed integrally with the vertical wall 74A at the reverse surface side of the vertical wall 74A that faces the door glass 18. The two sealing lips 36 are provided at this inner weatherstrip 82, and the through-holes 38 are formed in the vertical wall 74A in a vicinity of the upper side of the sealing lip 36 that is at the upper side. In the present embodiment, the through-holes 38 are provided at a position that overlaps the sealing lip 36 at the upper side, as seen from the vehicle side surface.

Figure 26:
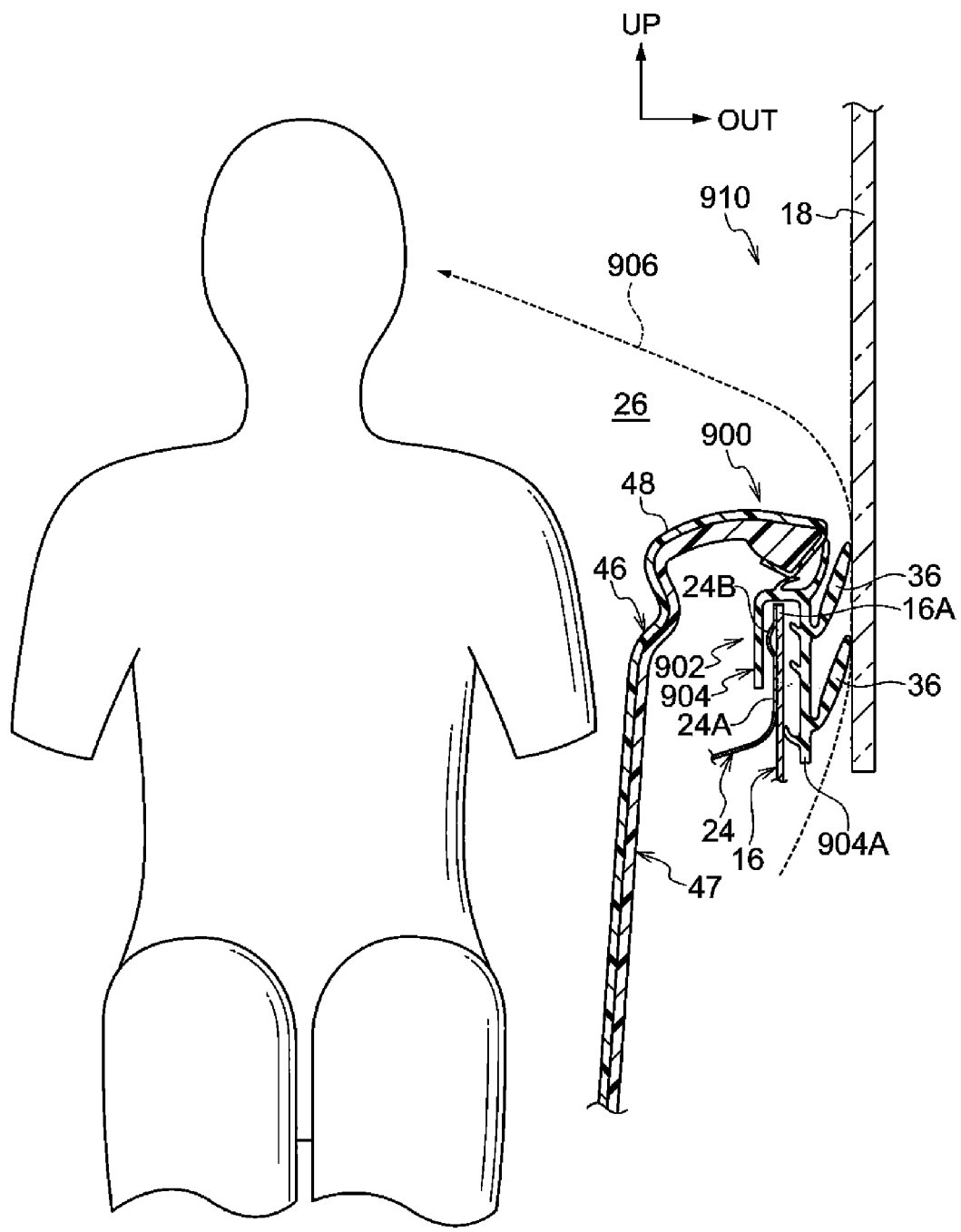
FIG. 26 is a vertical sectional view showing the structure of the vehicle door structure relating to the comparative example.

In contrast, a vehicle door structure 900 relating to a comparative example is shown in FIG. 26. As shown in FIG. 26, an inner weatherstrip 902, that has a mounting portion 904 whose cross-section is substantially U-shaped and in which an opening is formed at the vehicle lower side, is provided at a front side door 910 to which this vehicle door structure 900 is applied. The mounting portion 904 is mounted by plural clips (see FIG. 27) to the joined portion of the upper edge portion 16A of the door inner panel 16 and the vertical wall portion 24A of the door inner reinforcement 24. The two sealing lips 36, that extend to as to project-out toward the door glass 18 side, are provided in parallel at the vehicle upper and lower sides at a vertical wall 904A at the vehicle outer side of the mounting portion 904. The distal ends of the sealing lips 36 slidingly contact the door glass 18. Note that through-holes and a closed space at the rear thereof are not provided at the vertical wall 904A, that faces the door glass 18, at the inner weatherstrip 902.

In this vehicle door structure 900, the distal ends of the sealing lips 36 abut the inner wall surface of the door glass 18, but the distal ends of the sealing lips 36 cannot be strongly pushed against the door glass 18, and there is the possibility that the sound-insulating performances of the contact points of the sealing lips 36 and the door glass 18 will deteriorate. Therefore, there is the possibility that sound at the exterior of the front side door 910 (noise at the vehicle exterior, and the like) will penetrate into the vehicle cabin from the gaps between the distal ends of the sealing lips 36 and the door glass 18, as shown by arrow 906.

Figure 27:
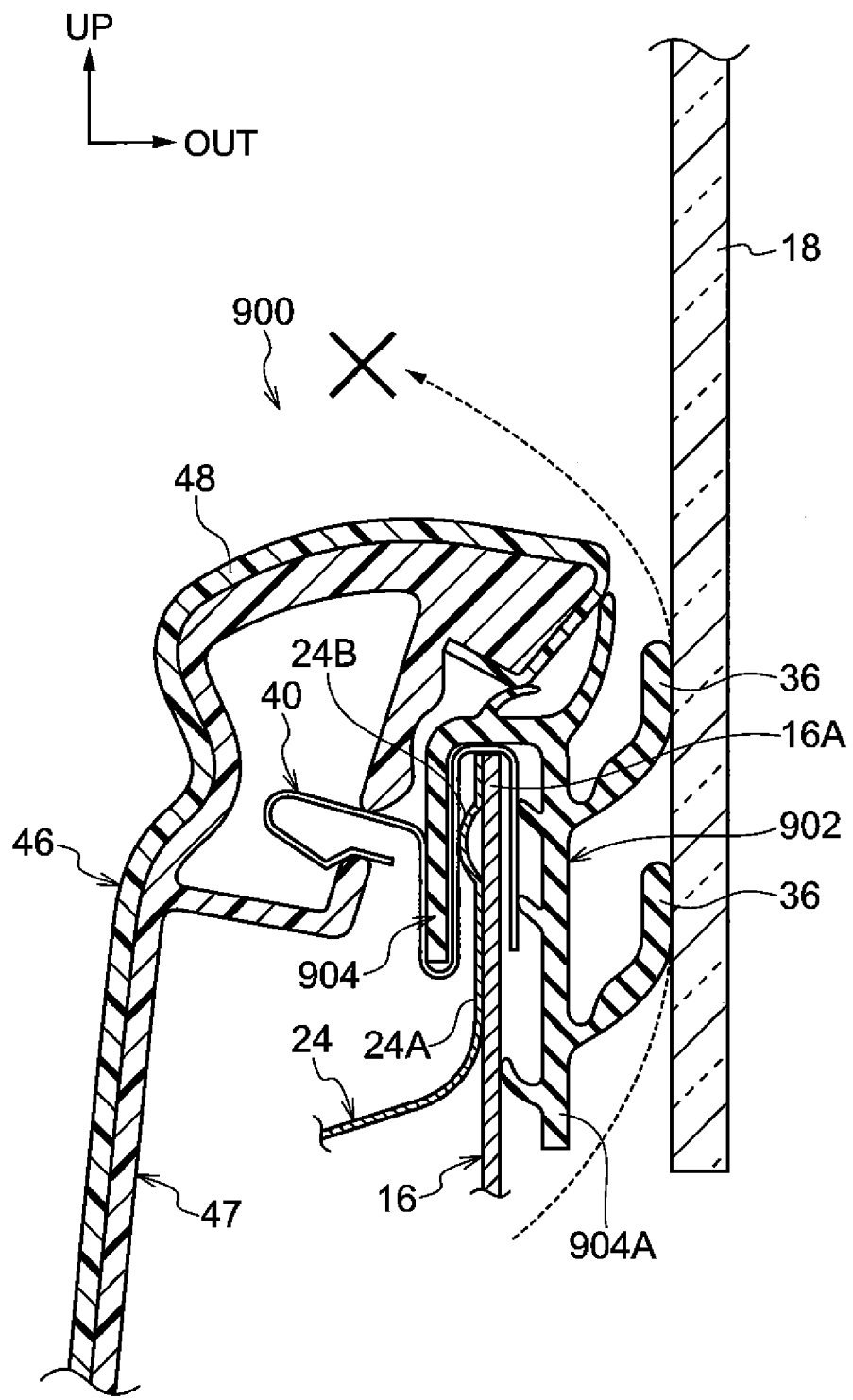
FIG. 27 is a vertical sectional view showing a state in which the sealing lips of the inner weatherstrip, that is used in the vehicle door structure relating to the comparative example, are pushed against the door glass.

On the other hand, as shown in FIG. 27, when the distal ends of the sealing lips 36 are strongly pushed against the inner side surface of the door glass 18 and the contact surface area is increased, the sound-insulating effect of sounds at the exterior of the front side door 910 improves, but the frictional force of the contacting portions of the distal ends of the sealing lips 36 and the door glass 18 increases. Due thereto, the sliding resistance at times of raising and lowering the door glass 18 increases, and there is the possibility that the raising/lowering durability of the inner weatherstrip 902 will deteriorate, or the like, and the sealing lips 36 will turn-over toward the vehicle lower side at times of lowering the door glass 18. Further, there is the possibility that it will be mistakenly detected that a finger has been caught by the door glass 18, or the like, which will lead to an increase in size of the mechanisms due to the increase in the raising/lowering torque of the door glass 18. Therefore, the distal ends of the sealing lips 36 cannot be strongly pushed-against the door glass 18 more than necessary.

In contrast, at the inner weatherstrip 72 to which the vehicle door structure 70 of the first modified example illustrated in FIG. 9 is applied, the spring-mass system 60 having one degree of freedom (see FIG. 7) is structured by providing the through-holes 38 in the vertical wall 74A at the lower side of the two sealing lips 36, and by providing the wall body 74 that forms the closed space S at the rear of the through-holes 38. Similarly, at the inner weatherstrip 82 to which the vehicle door structure 80 of the second modified example illustrated in FIG. 10 is applied, the spring-mass system 60 having one degree of freedom (see FIG. 7) is structured by providing the through-holes 38 in the vertical wall 74A at the upper side of the two sealing lips 36, and by providing the wall body 74 that forms the closed space S at the rear of the through-holes 38. Accordingly, as shown in FIG. 7, when sound of a specific frequency hits the mass 62 that is the air at the through-hole 38 portion, the mass 62 vibrates in the expanding/contracting direction of the spring 64. Due thereto, the energy of the sound changes into vibration energy, and further, due to the vibration energy changing into thermal energy due to the viscous resistance and friction of the air, sound of the specific frequency is markedly reduced.

Figure 11:
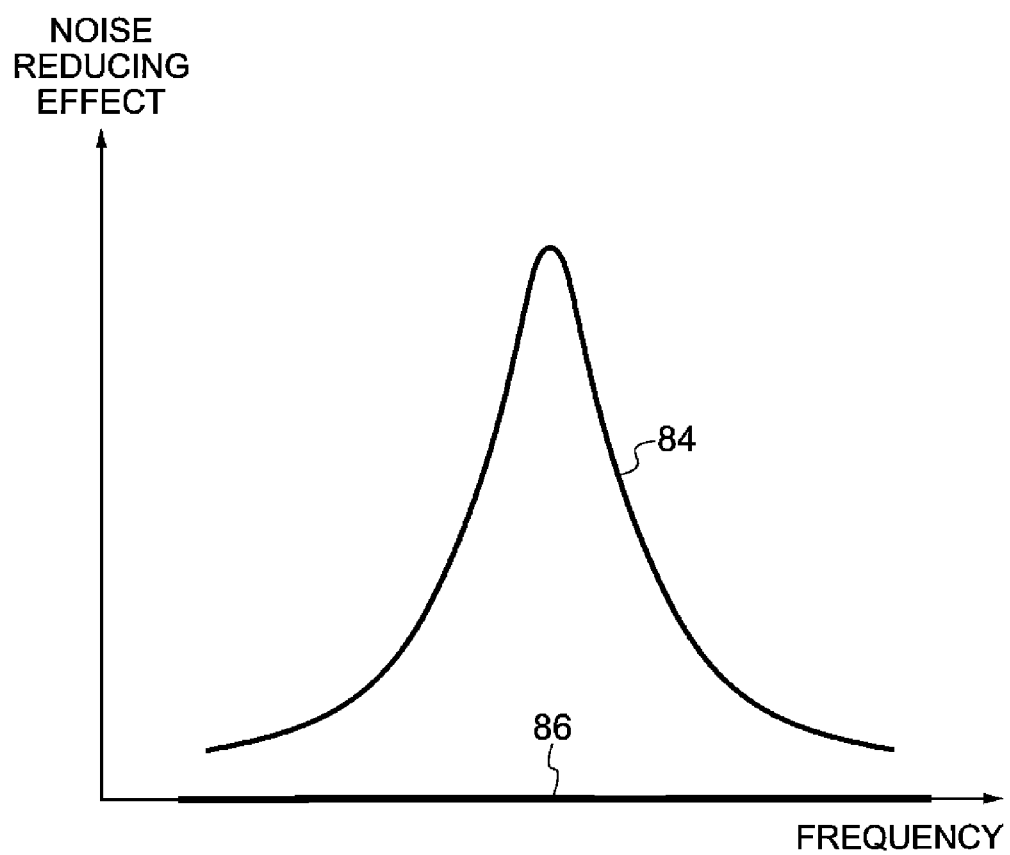
FIG. 11 is a graph showing the relationships between frequency and the sound reducing effect in the vehicle door structure relating to the first modified example or the second modified example and a vehicle door structure of a comparative example.

FIG. 11 is a graph showing the relationship between frequency and the sound reducing effect. In this graph, the case of the vehicle door structure 900 of the comparative example (see FIG. 26) is shown by line 86, and the cases of the vehicle door structures 70, 80 of the first modified example and the second modified example (see FIG. 9, FIG. 10) are shown by line 84. As shown in this graph, in the vehicle door structures 70, 80 of the first modified example and the second modified example, the sound reducing effect at a specific frequency is great as compared with the vehicle door structure 900 of the comparative example.

Figure 12:
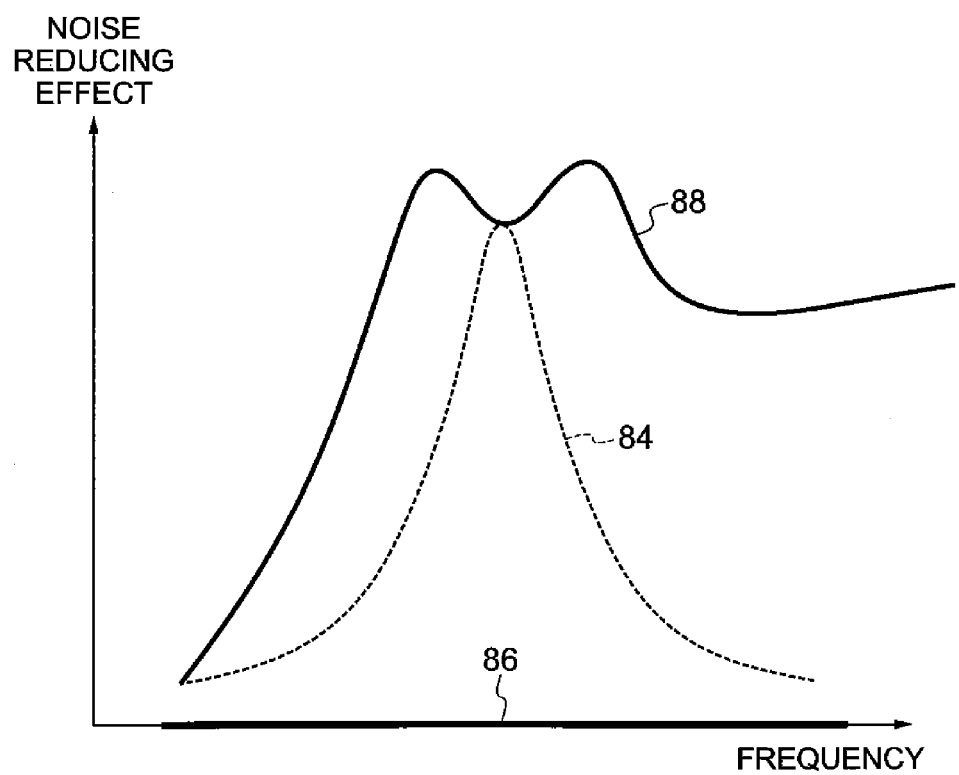
FIG. 12 is a graph showing the relationships between frequency and the sound reducing effect in the vehicle door structure relating to the first embodiment, and the vehicle door structure relating to the first modified example or the second modified example, and the vehicle door structure of the comparative example.

Moreover, in FIG. 12, the relationship between frequency and the sound reducing effect in the case of the vehicle door structure 28 of the first embodiment (see FIG. 2 and the like) is shown by line 88. As shown in FIG. 12, in the vehicle door structure 28 of the first embodiment (see FIG. 2 and the like), by forming the through-holes 38 in the vertical wall 34A between the two sealing lips 36 that are at the vehicle upper and lower sides of the inner weatherstrip 30, the frequency range in which sound is reduced is wide as compared with the vehicle door structures of the first modified example and the second modified example (see FIG. 9, FIG. 10).

Here, the operation and effects of the vehicle door structure 28 of the first embodiment are described in comparison with the vehicle door structure 900 of the comparative example.

Figure 13A:
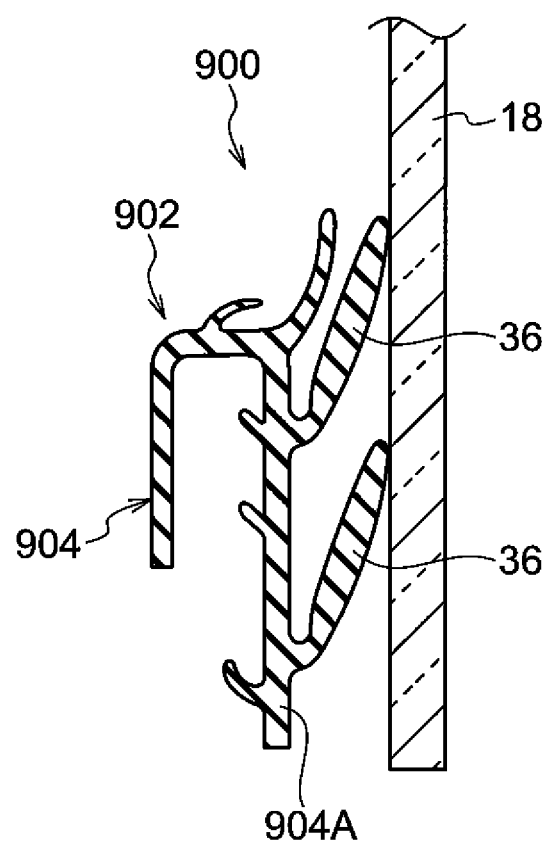
FIG. 13A is a vertical sectional view showing an inner weatherstrip and a door glass that are used in the vehicle door structure of the comparative example.
Figure 13B:
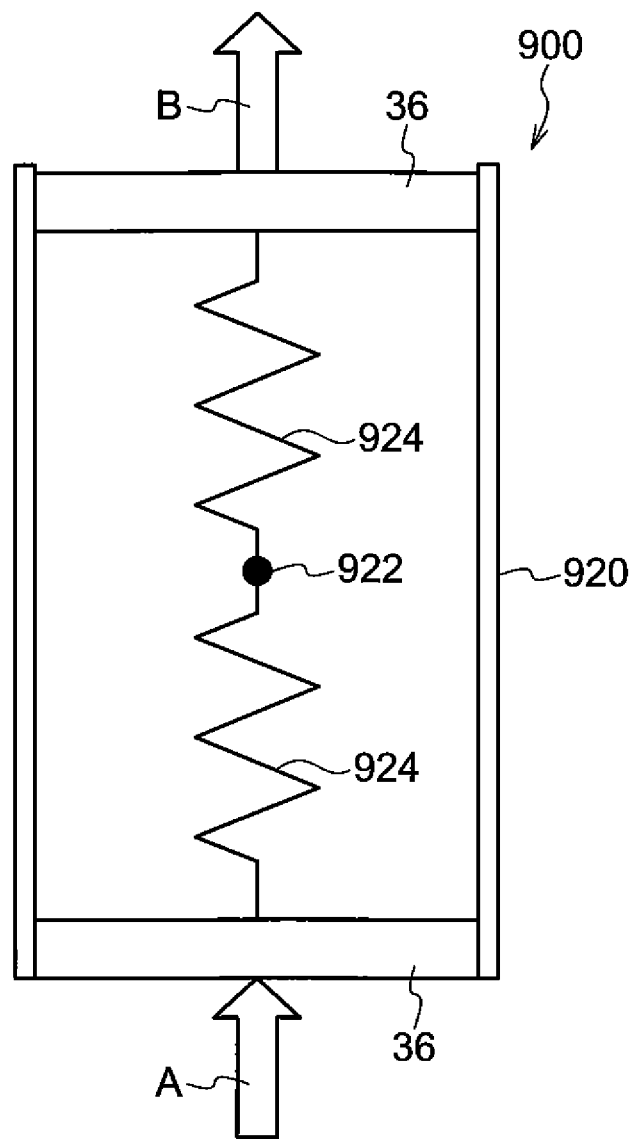
FIG. 13B is a drawing showing, in a schematic manner, two sealing lips of the inner weatherstrip that is used in the vehicle door structure of the comparative example.

As shown in FIG. 13A, in the vehicle door structure 900 of the comparative example, the distal ends of the two sealing lips 36 at the vehicle upper and lower sides of the inner weatherstrip 902 abut the door glass 18. When this structure is simplified, as shown in FIG. 13B, there is a structure in which the sealing lip 36 at the upper side and the sealing lip 36 at the lower side within a wall body 920 are connected by two upper and lower springs 924 that are connected at a connection point 922 at the central portion. In this structure, incident sound enters into the wall body 920 from the gap with the sealing lip 36 at the lower side as shown by arrow A, and transmitted sound exits to the exterior of the wall body 920 from the gap with the sealing lip 36 at the upper side as shown by arrow B.

Figure 13C:
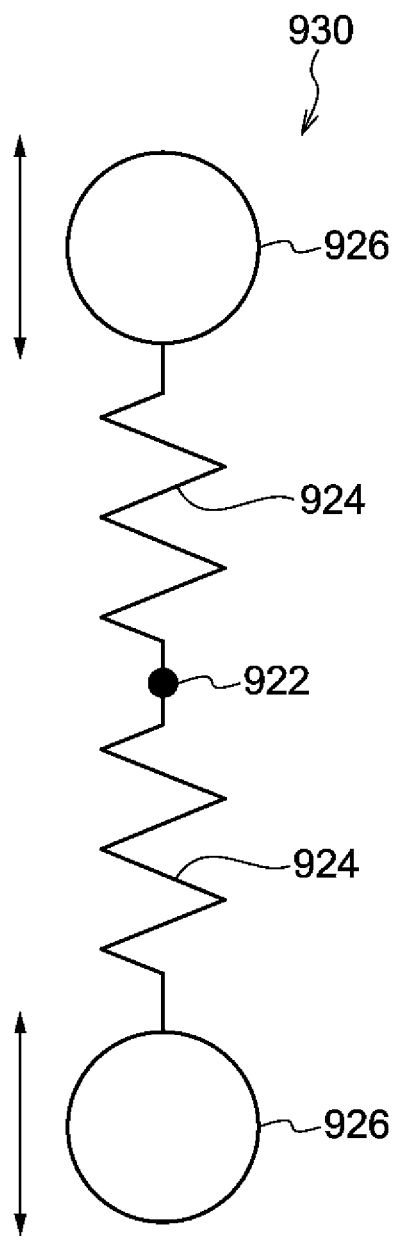
FIG. 13C is a drawing showing a spring-mass system that is formed by the two sealing lips of the inner weatherstrip that is used in the vehicle door structure of the comparative example.

When the structure shown in FIG. 13B is modeled, as shown in FIG. 13C, there is a spring-mass system 930 of two degrees of freedom in which the gaps between the sealing lip 36 at the upper side, the sealing lip 36 at the lower side and the wall body 920 are masses 926, and the closed space between the two sealing lips 36 is two springs 924, 924. Accordingly, when sound of a specific frequency hits the mass 926, the mass 926 vibrates in the expanding/contracting directions of the springs 924, 924 (the directions of the arrows), and the energy of the sound changes into vibration energy. Because this spring-mass system 930 has vertical symmetry, it is equivalent to a spring-mass system of one degree of freedom, and has resonance of one peak.

Figure 14A:
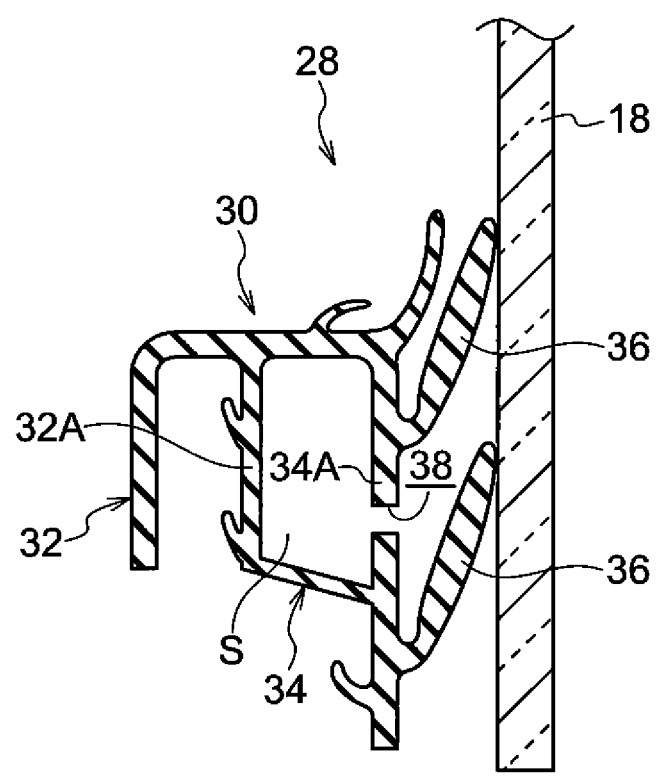
FIG. 14A is a vertical sectional view showing the inner weatherstrip and the door glass that are used in the vehicle door structure relating to the first embodiment.
Figure 14B:
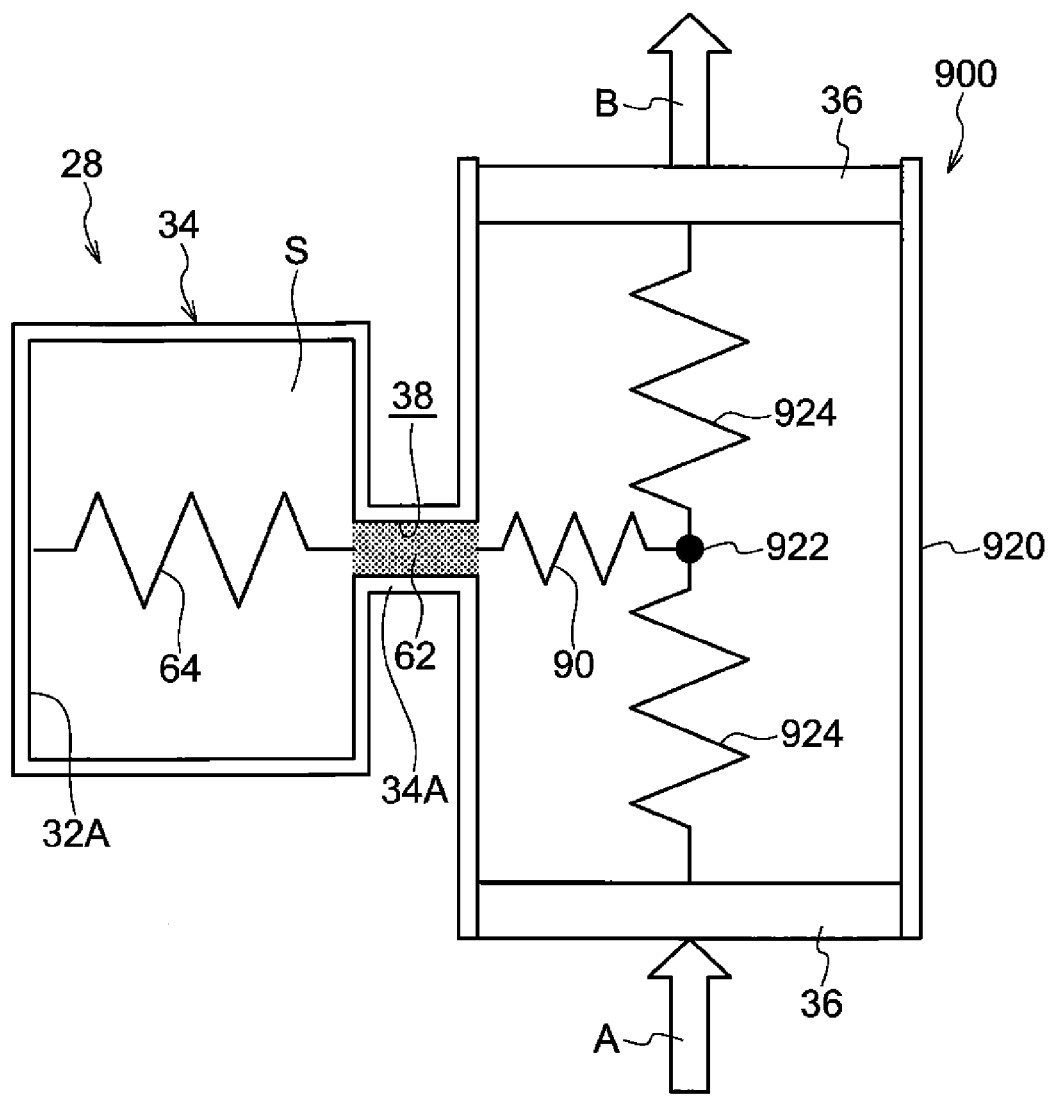
FIG. 14B is a drawing showing, in a schematic manner, two sealing lips and the through-hole and the closed space of the inner weatherstrip that is used in the vehicle door structure relating to the first embodiment.

In contrast, in the vehicle door structure 28 of the first embodiment, as shown in FIG. 14A, there is provided the inner weatherstrip 30 that has the through-holes 38, that are formed in the vertical wall 34A between the two sealing lips 36 that abut the door glass 18, and the wall body 34 that forms the closed space S at the rear of the through-holes 38. When this structure is simplified, as shown in FIG. 14B, there is a structure in which the wall body 34 that is formed by the vehicle door structure 28 is connected to the wall body 920 that is formed by the vehicle door structure 900. Namely, the wall body 34 is connected to the wall body 920 via the through-holes 38 of the vertical wall 34A. Further, the air of the through-hole 38 portion that is formed in the vertical wall 34A is the mass 62, and the spring 64 that is the closed space S of the wall body 34 and one end of a spring 90 that is the closed space of the wall body 920 are connected to this mass 62, and the other end of the spring 90 is connected to the connection point 922.

Figure 14C:
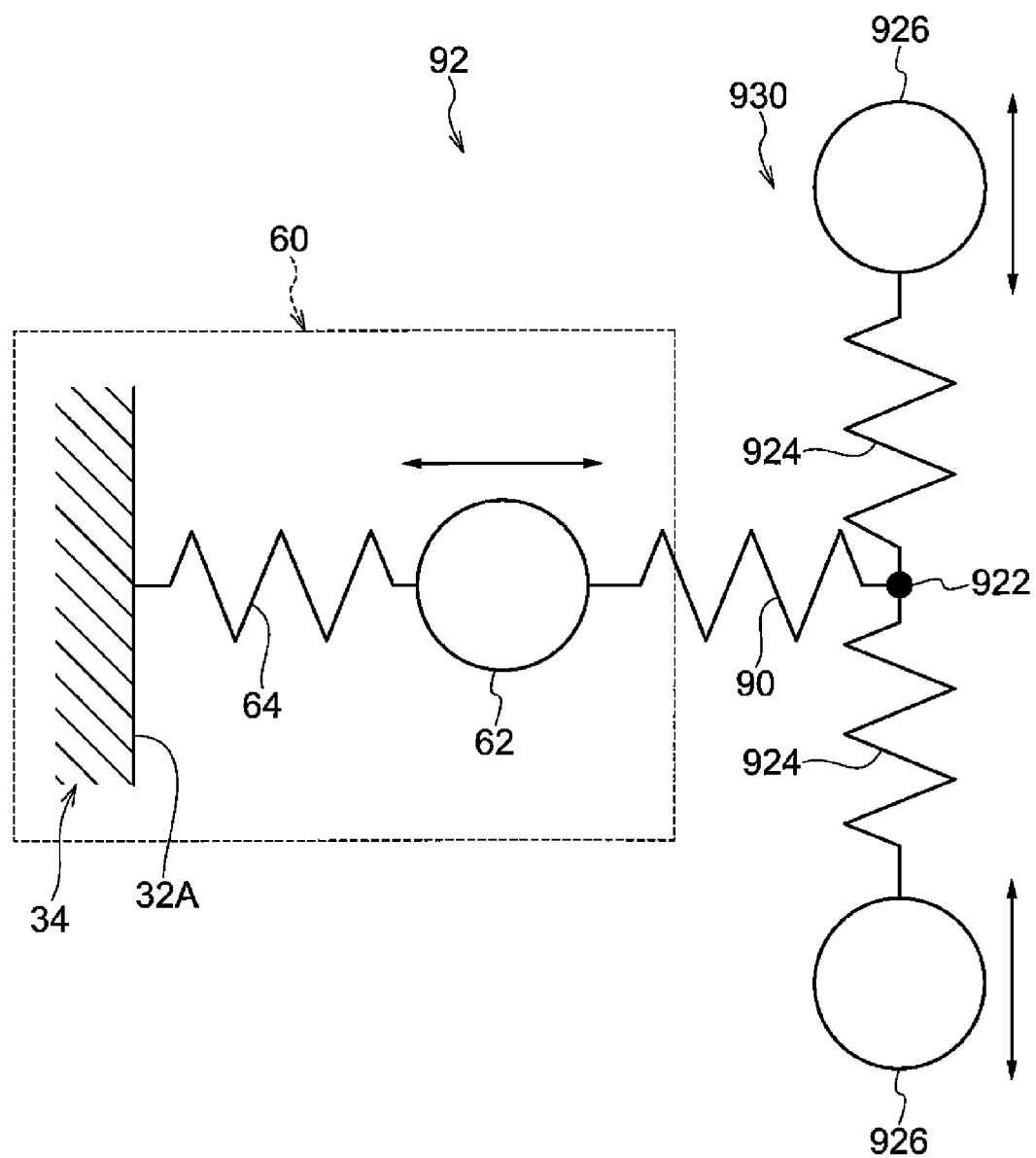
FIG. 14C is a drawing showing a spring-mass system that is formed by the two sealing lips and a through-hole and a closed space of the inner weatherstrip that is used in the vehicle door structure relating to the first embodiment.

When the structure shown in FIG. 14B is modeled, as shown in FIG. 14C, there is a spring-mass system 92 of three degrees of freedom in which the spring-mass system 60 of one degree of freedom, that is structured by the through-holes 38 and the wall body 34 that forms the closed space S, is additionally connected to the spring-mass system 930 of two degrees of freedom that is structured by the two upper and lower sealing lips 36. Namely, in the spring-mass system 60 that is added to the spring-mass system 930, when sound of a specific frequency hits the mass 62 that is the air of the through-hole 38 portion, the mass 62 vibrates severely in the expanding/contracting direction of the spring 64 (the direction of the arrow). Due thereto, the energy of the sound changes into vibration energy, and further, due to the vibration energy changing into thermal energy due to the viscous resistance and the friction of the air, sound of the specific frequency is markedly reduced. At this time, because the spring-mass system 930 has vertical symmetry, it is equivalent to a spring-mass system of one degree of freedom, and therefore, the spring-mass system 92 is equivalent to a spring-mass system of two degrees of freedom. Therefore, as shown in FIG. 12, the line 88 of the sound reducing effect has resonance of two peaks, and a sound reducing effect can be obtained in a wide range of frequencies.

Figure 15:
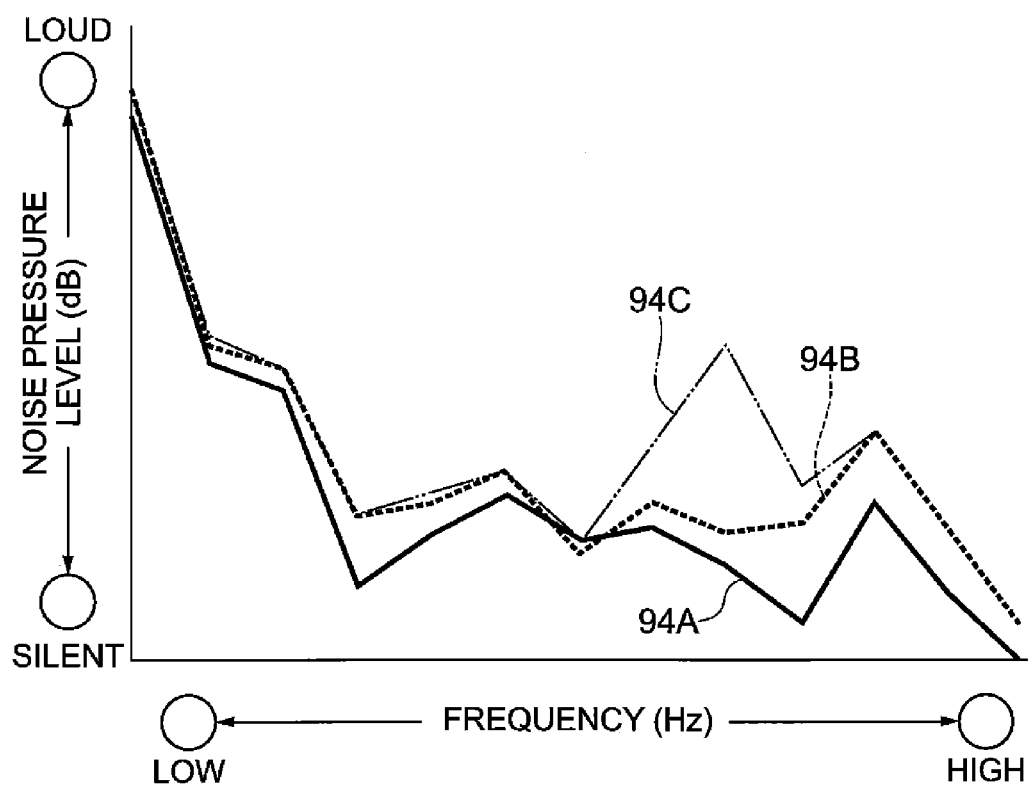
FIG. 15 is a graph showing the relationship between frequency and sound pressure level in the vehicle door structure relating to the first embodiment, and the vehicle door structure relating to the first modified example (the second modified example), and the vehicle door structure of the comparative example.

The results of measuring the sound pressure level at the door inner side with respect to frequency, for the vehicle door structure 28 of the present embodiment, the vehicle door structure 70 of the first modified example and the vehicle door structure 900 of the comparative example, are shown in FIG. 15. In this graph, the sound pressure level in accordance with the vehicle door structure 28 is shown by solid line 94A, the sound pressure level in accordance with the vehicle door structure 70 is shown by dotted line 94B, and the sound pressure level in accordance with the vehicle door structure 900 is shown by two-dot chain line 94C. As a result, it can be understood that the lowest sound pressure level is at the vehicle door structure 28, and the next lowest sound pressure level is at the vehicle door structure 70. Further, at the vehicle door structure 80 of the second modified example, the sound pressure level was substantially the same as the dotted line 94B. Accordingly, a sound reducing effect appears in a wide range of frequencies by utilizing the vehicle door structure 28 in which the through-holes 38 are formed in the vertical wall 34A between the two sealing lips 36 that abut the door glass 18. Therefore, the effect of insulating sounds that penetrate from the vehicle exterior into the vehicle cabin 26 can be improved.

A second embodiment of the vehicle door structure relating to the present invention is described next by using FIG. 16. Note that the same structural portions as the above-described first embodiment are denoted by the same numbers, and description thereof is omitted.

Figure 16:
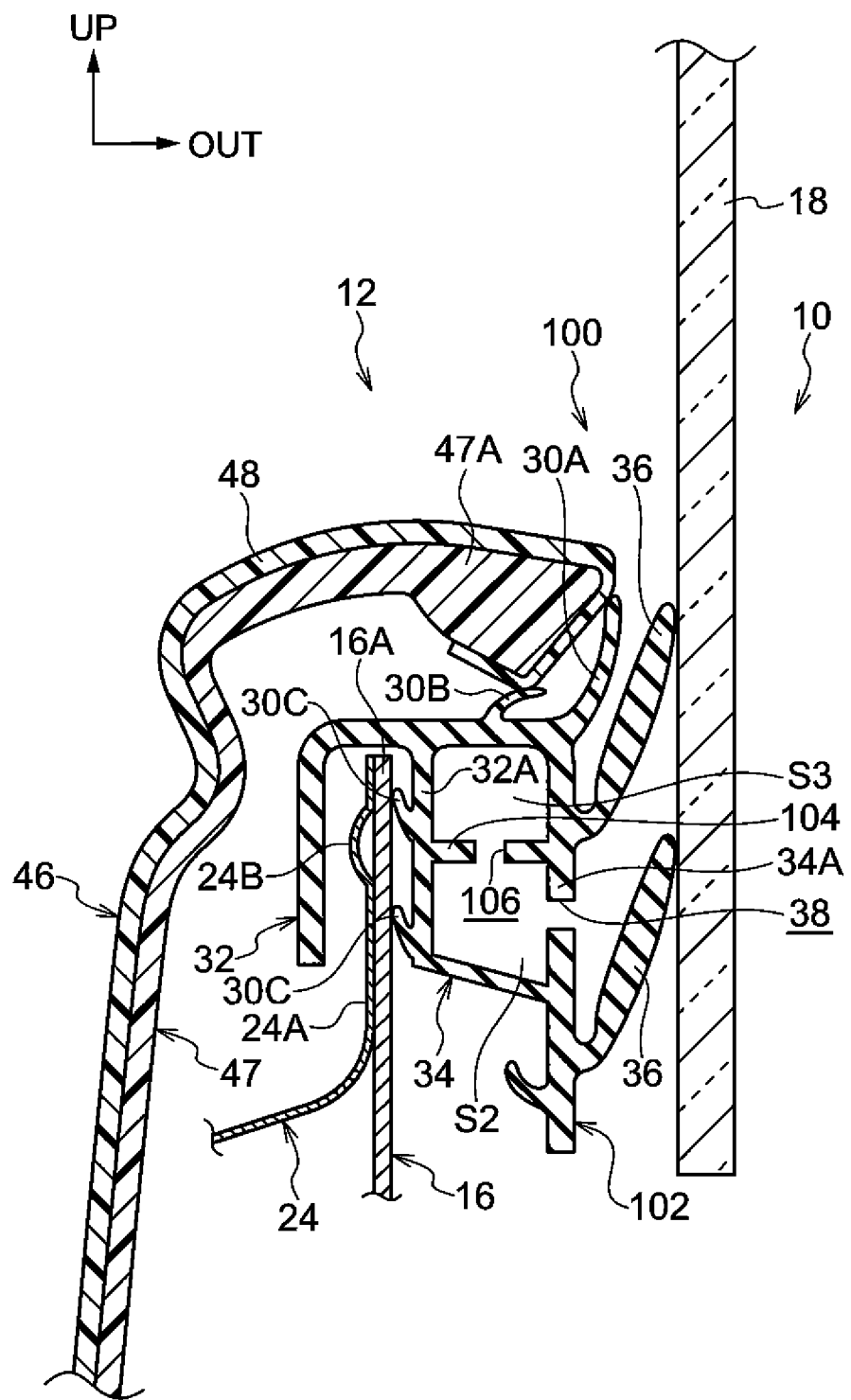
FIG. 16 is a vertical sectional view showing the structure of a vehicle door structure relating to a second embodiment.

As shown in FIG. 16, at an inner weatherstrip 102 to which a vehicle door structure 100 is applied, the through-holes 38 are formed in the vertical wall 34A that faces the door glass 18, and the wall body 34 that forms a closed space is provided at the rear of the through-holes 38 (at the side opposite the door glass 18). A partitioning wall 104, that is disposed along the vehicle transverse direction and divides the closed space, is provided at the interior of the wall body 34. Through-holes 106, that serve as examples of another opening, are provided in the central portion of the partitioning wall 104.

Due thereto, a space S2 is provided by the wall body 34 and the partitioning wall 104 at the rear of the through-holes 38 that are formed in the vertical wall 34A (at the side opposite the door glass 18), and further, another closed space S3 is provided by the wall body 34 and the partitioning wall 104 at the deep side (the side opposite the closed space S2) of the through-holes 106 that are formed in the partitioning wall 104. Namely, the wall body 34 of the inner weatherstrip 102 is a double structure via the partitioning wall 104 that is provided with the through-holes 106, and the through-holes 38 and the space S2 and the through-holes 106 and the closed space S3 are connected in series. In the present embodiment, the through-holes 106 are made to be circular shapes of substantially the same size as the through-holes 38.

The inner weatherstrip 102 is molded integrally of an elastic member of rubber or resin or the like. Due thereto, the wall body 34 that has the vertical wall 34A and the partitioning wall 104 can be manufactured easily.

Figure 17:
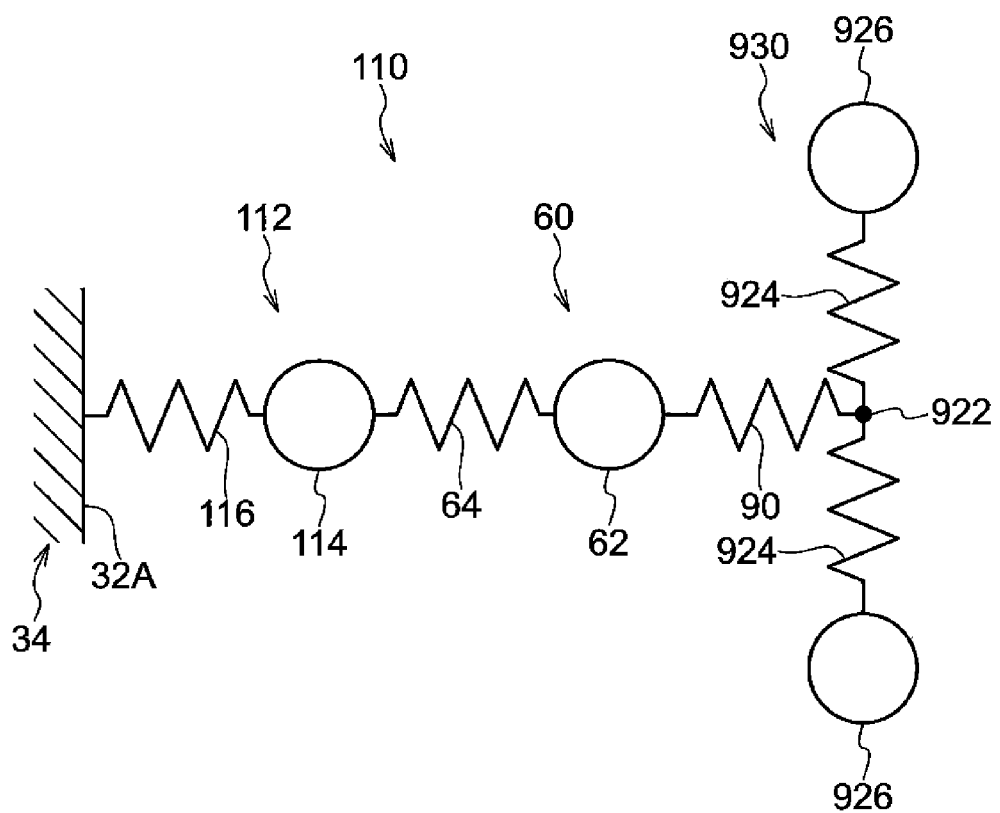
FIG. 17 is a drawing showing a spring-mass system in the vehicle door structure shown in FIG. 16.

As shown in FIG. 16 and FIG. 17, when the vehicle door structure 100 is modeled, in a vicinity of the partitioning wall 104, there is structured a spring-mass system 112 of one degree of freedom in which the air of the through-hole 106 portion that is formed in the partitioning wall 104 is a mass 114 and the closed space S3 at the deep side of the through-hole 106 is a spring 116. Namely, there is a spring-mass system 110 in which the spring-mass system 60, that has one degree of freedom and in which the air of the through-hole 38 portion is the mass 62 and the space S2 at the rear of the through-hole 38 is the spring 64, and the spring-mass system 112, that has one degree of freedom and is formed by the mass 114 and the spring 116, are connected in series to the spring-mass system 930 that is structured by the two upper and lower sealing lips 36. Due thereto, the trough between the two peaks of line 88 of the sound reducing effect shown in FIG. 12 becomes gradual, and the portion where the sound reducing effect weakens between the two peaks becomes smaller. Therefore, a sound reducing effect in a wide range of frequencies can be obtained more reliably.

Note that, in the vehicle door structure 100 of the second embodiment, the partitioning wall 104 is provided in the vehicle transverse direction (lateral direction) at the interior of the wall body 34, but the present invention is not limited to this. A partitioning wall may be provided in the vertical direction at the interior of the wall body 34, and through-holes may be provided in this partitioning wall. Namely, it suffices for there to be a structure in which the space S2 is formed at the rear of the through-holes 38 that are formed in the vertical wall 34A, and the other closed space S3 is provided at the deep side of the through-holes 106 of the partitioning wall that contacts the space S2. Further, in the vehicle door structure 100 of the second embodiment, the one partitioning wall 104 is provided at the interior of the wall body 34, but the present invention is not limited to this. Plural partitioning walls may be provided, and through-holes may be formed in each of the partitioning walls. Namely, larger numbers of partitioning walls and through-holes are more preferable. Due thereto, a sound reducing effect in a wide range of frequencies can be obtained more reliably.

A third embodiment of the vehicle door structure relating to the present invention is described next by using FIG. 18. Note that the same structural portions as the above-described first embodiment and second embodiment are denoted by the same numbers, and description thereof is omitted.

Figure 18:
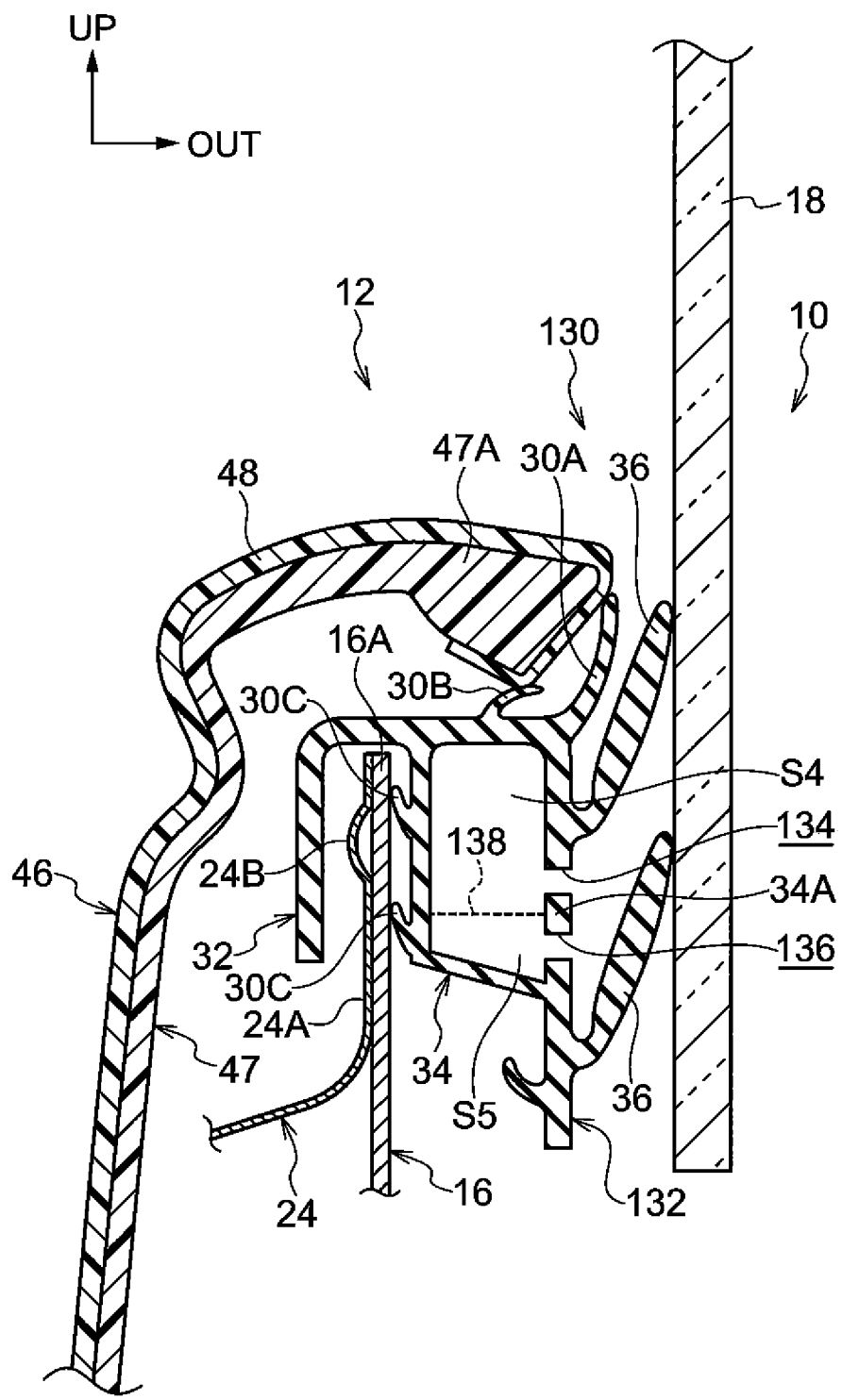
FIG. 18 is a vertical sectional view showing the structure of a vehicle door structure relating to a third embodiment.

As shown in FIG. 18, at an inner weatherstrip 132 to which a vehicle door structure 130 is applied, two through-holes (openings) 134, 136 are provided in parallel in the vertical direction between the two sealing lips 36 at the vertical wall 34A that faces the door glass 18. Moreover, the wall body 34 that forms a closed space is provided at the rear of the Through-holes 134, 136 (the side opposite the door glass 18). By providing the two through-holes 134, 136 in the vertical wall 34A, a virtual wall 138 is disposed along the vehicle transverse direction between the through-holes 134, 136 and within the wall body 34. Namely, due to the virtual wall 138, the closed space within the wall body 34 is divided, and a space S4 is formed at the rear of the through-hole 134, and a space S5 is formed at the rear of the through-hole 136.

In this vehicle door structure 130, there is a structure in which a spring-mass system, that has one degree of freedom and is structured by the through-hole 134 and the space S4, and a spring-mass system, that has one degree of freedom and is structured by the through-hole 136 and the space S5, are disposed in parallel with the spring-mass system 930 (see FIG. 17) that is structured by the two upper and lower sealing lips 36. Due thereto, a sound reducing effect in a wide range of frequencies can be obtained more reliably.

Note that, in the vehicle door structure 130 of the third embodiment, the two through-holes 134, 136 are provided in the vertical direction between the two sealing lips 36 at the vertical wall 34A. However, the present invention is not limited to this, and three or more through-holes may be provided in the vertical direction. Further, there may be a structure in which the through-holes are disposed in a staggered form as seen from the vehicle side surface. Namely, a larger number of through-holes is preferable. Due thereto, a sound reducing effect in a wide range of frequencies can be obtained more reliably.

A fourth embodiment of the vehicle door structure relating to the present invention is described next by using FIG. 19. Note that the same structural portions as the above-described first through third embodiments are denoted by the same numbers, and description thereof is omitted.

Figure 19:
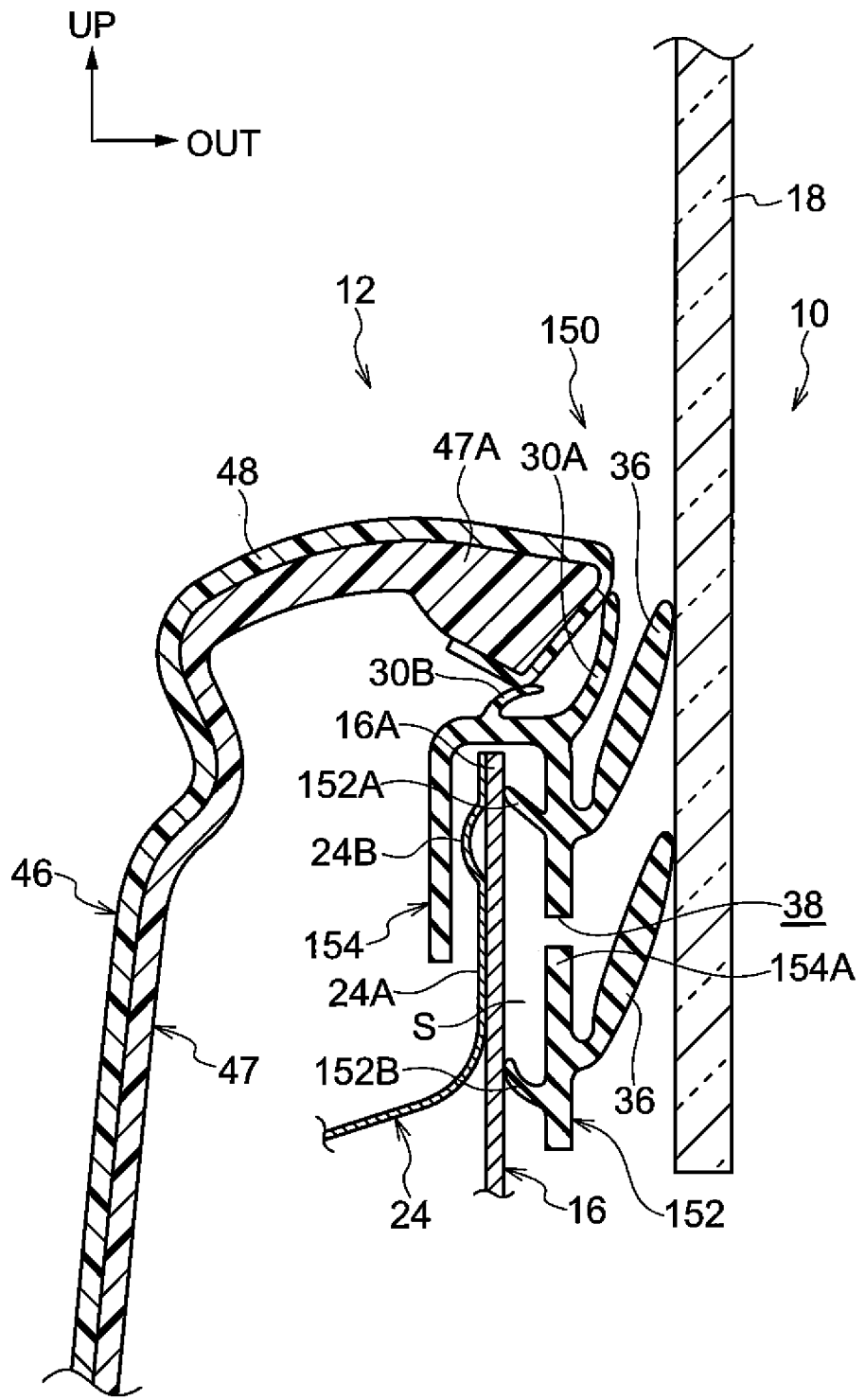
FIG. 19 is a vertical sectional view showing the structure of a vehicle door structure relating to a fourth embodiment.

As shown in FIG. 19, at an inner weatherstrip 152 to which a vehicle door structure 150 is applied, a mounting portion 154, whose cross-section is substantially U-shaped and at which an opening is formed at the vehicle lower side, is provided. The mounting portion 154 is fit-in at the joined portion of the upper edge portion 16A of the door inner panel 16 and the vertical wall portion 24A of the door inner reinforcement 24, and is fixed by plural clips (not shown). A vertical wall 154A at the vehicle outer side of the mounting portion 154 is disposed so as to face the door glass 18, and the two sealing lips 36 are provided at the outer side surface in the vehicle transverse direction of the vertical wall 154A. The through-holes 38 are formed between the two sealing lips 36 of the vertical wall 154A. Lip portions 152A, 152B, that abut the upper edge portion 16A of the door inner panel 16 at the upper side and the lower side of the through-holes 38 (at the side opposite the two sealing lips 36), are formed at the inner side surface in the vehicle transverse direction of the vertical wall 154A. The lip portions 152, 152B are provided so as to close the space at rear of the through-holes 38 (the side opposite the door glass 18).

In this vehicle door structure 150, the closed space S is formed at the rear of the through-holes 38 of the vertical wall 154A by the wall body that is structured by the vertical wall 154A and the upper and lower lip portions 152A, 152B and the upper edge portion 16A of the door inner panel 16. Due thereto, a spring-mass system, in which the air at the through-hole 38 portion is a mass and the closed space S at the rear of the through-hole 38 is a spring, is formed. In this vehicle door structure 150, because the dimension in the vehicle transverse direction of the inner weatherstrip 152 is small, the closed space S can be formed at the rear of the through-holes 38 even if the position of the door inner panel 16 is not changed with respect to the vehicle door structure 900 of the comparative example. Accordingly, sound can be reduced effectively even in cases in which there are constraints on space due to other parts. Therefore, the effect of insulating sounds that penetrate from the vehicle exterior into the vehicle cabin can be improved.

A fifth embodiment of the vehicle door structure relating to the present invention is described next by using FIG. 20. Note that the same structural portions as the above-described first through fourth embodiments are denoted by the same numbers, and description thereof is omitted.

Figure 20:
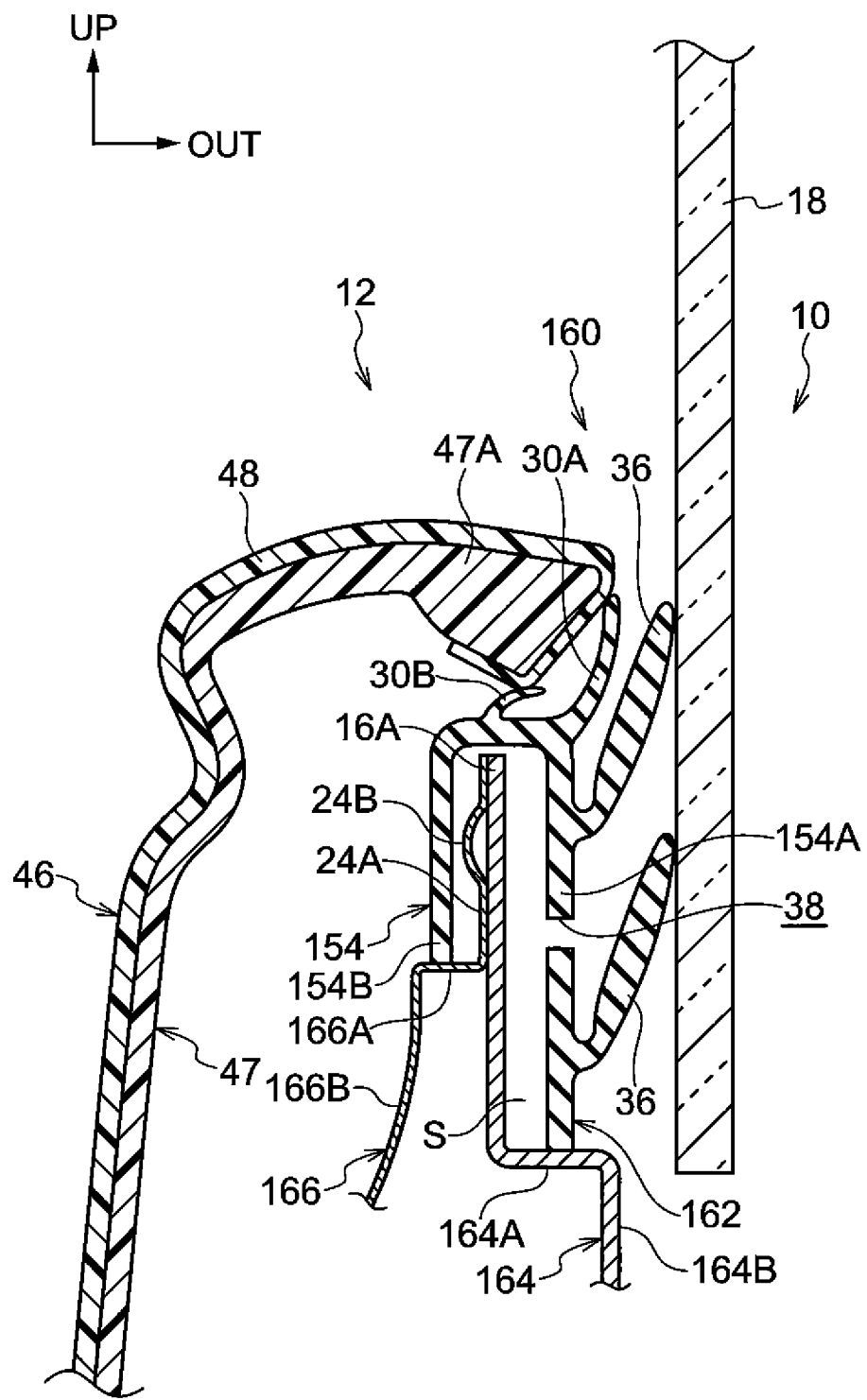
FIG. 20 is a vertical sectional view showing the structure of a vehicle door structure relating to a fifth embodiment.

As shown in FIG. 20, in a vehicle door structure 160, the mounting portion 154 is provided at an inner weatherstrip 162, and the through-holes 38 are formed in the vertical wall 154A at the vehicle outer side of the mounting portion 154. A door inner panel 164 has a lateral wall portion 164A that is bent toward the vehicle transverse direction outer side at the lower portion side of the upper edge portion 16A, and a vertical wall portion 164B that is bent toward the vehicle lower side from the vehicle transverse direction outer side end portion of the lateral wall portion 164A. A door inner reinforcement 166 has a lateral wall portion 166A that is bent toward the vehicle transverse direction inner side at the lower portion side of the vertical wall portion 24A at the upper end, and a vertical wall portion 166B that is a curved shape and is bent toward the vehicle lower side from the vehicle transverse direction inner side end portion of the lateral wall portion 166A.

In the state in which the mounting portion 154 of the inner weatherstrip 162 is fit-in and fixed to the joined portion of the upper edge portion 16A of the door inner panel 164 and the vertical wall portion 24A of the door inner reinforcement 166, the lower end portion of the vertical wall 154A at the vehicle outer side contacts the lateral wall portion 164A of the door inner panel 164, and the lower end portion of a vertical wall 154B at the vehicle inner side contacts the lateral wall portion 166A of the door inner reinforcement 166. Namely, the lateral wall portion 164A of the door inner panel 164 and the lateral wall portion 166A of the door inner reinforcement 166 are provided in order to close the space at the rear of the through-holes 38.

Due thereto, the closed space S is formed at the rear of the through-holes 38 of the vertical wall 154A, by the wall body that is structured by the mounting portion 154 and the door inner panel 164 and the door inner reinforcement 166. Accordingly, a spring-mass system, in which the air at the through-hole 38 portion is a mass and the closed space S at the rear of the through-hole 38 is a spring, is structured.

In this vehicle door structure 160, because the dimension in the vehicle transverse direction of the inner weatherstrip 162 is small, sound can be effectively reduced even in cases in which there are constraints on space due to other parts. Therefore, the effect of insulating sounds that penetrate from the vehicle exterior into the vehicle cabin can be improved.

A sixth embodiment of the vehicle door structure relating to the present invention is described next by using FIG. 21. Note that the same structural portions as the above-described first through fifth embodiments are denoted by the same numbers, and description thereof is omitted.

Figure 21:
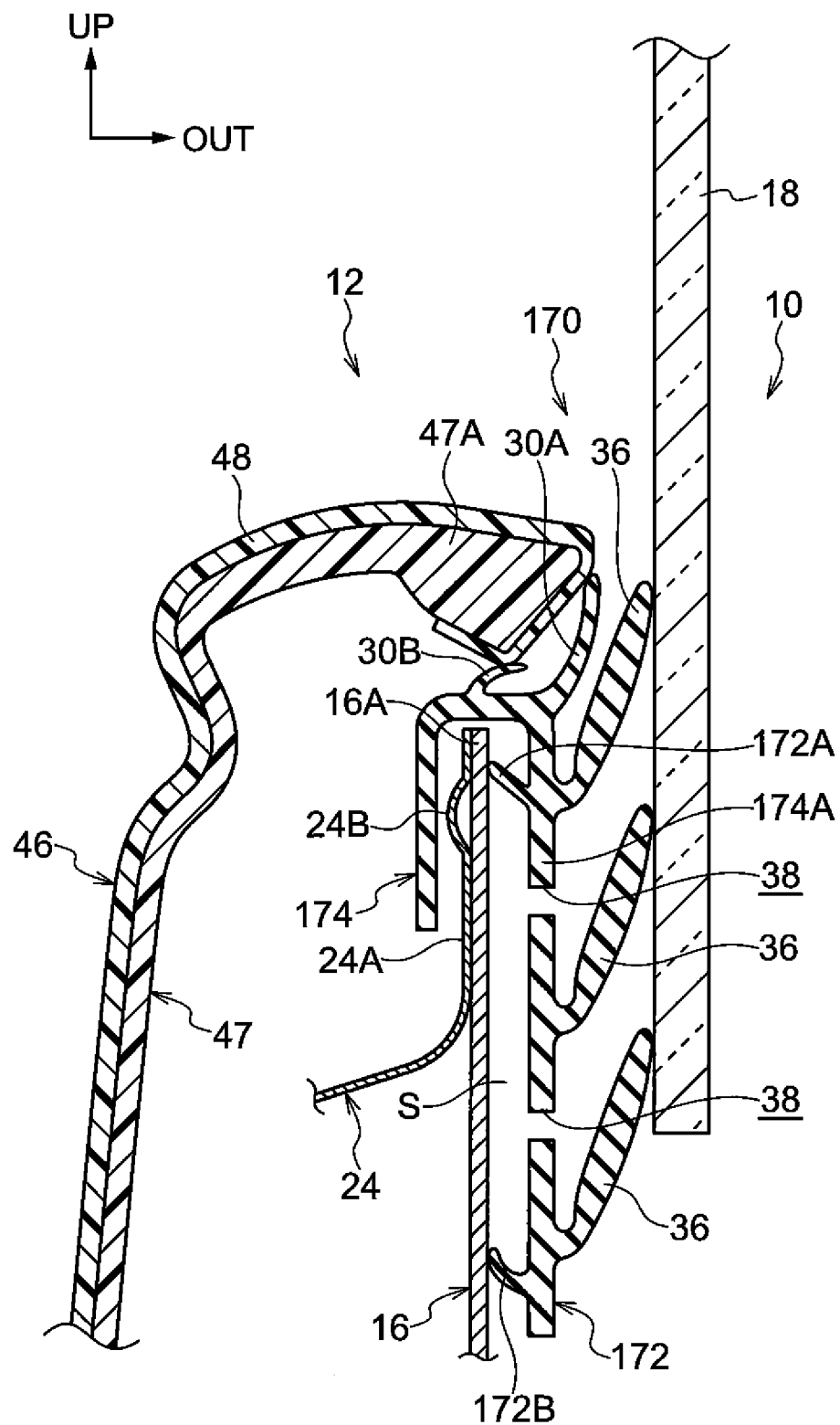
FIG. 21 is a vertical sectional view showing the structure of a vehicle door structure relating to a sixth embodiment.

As shown in FIG. 21, in a vehicle door structure 170, a substantially U-shaped mounting portion 174 is provided at an inner weatherstrip 172, and the mounting portion 174 is fit-in at the joined portion of the upper edge portion 16A of the door inner panel 16 and the vertical wall portion 24A of the door inner reinforcement 24, and is fixed by plural clips (not shown). A vertical wall 174A at the vehicle outer side of the mounting portion 174 is disposed so as to face the door glass 18, and the three sealing lips 36 are provided in the vertical direction at the outer side surface in the vehicle transverse direction of the vertical wall 174A. The through-holes 38 are formed respectively between the three sealing lips 36 of the vertical wall 174A. Lip portions 172A, 172B, that abut the upper edge portion 16A of the door inner panel 16 at the upper side and the lower side with respect to the two through-holes 38, are formed at the inner side surface in the vehicle transverse direction of the vertical wall 174A. The lip portions 172A, 172B are provided so as to close the space at the rear (the side opposite the door glass 18) of the two through-holes 38.

In this vehicle door structure 170, the closed space S is formed at the rear of the through-holes 38 that are provided in the vertical wall 174A, by the wall body that is structured by the vertical wall 174A and the upper and lower lip portions 172A, 172B and the upper edge portion 16A of the door inner panel 16. Due thereto, the number of sealing lips 36 is increased, and the through-holes 38 can be opened between these sealing lips 36, and sound can be reduced more effectively by the spaces at the rear of the respective through-holes 38. Therefore, the effect of insulating sounds that penetrate from the vehicle exterior into the vehicle cabin can be improved more reliably.

Note that, although there are three of the sealing lips 36 in the vehicle door structure 170 of the sixth embodiment, the number of sealing lips 36 may be increased further, and through-holes may be provided between the respective sealing lips 36. By making the number of the sealing lips 36 and the number of the through-holes be large, the sound insulating effect can be improved further.

A seventh embodiment of the vehicle door structure relating to the present invention is described next by using FIG. 22. Note that the same structural portions as the above-described first through sixth embodiments are denoted by the same numbers, and description thereof is omitted.

Figure 22:
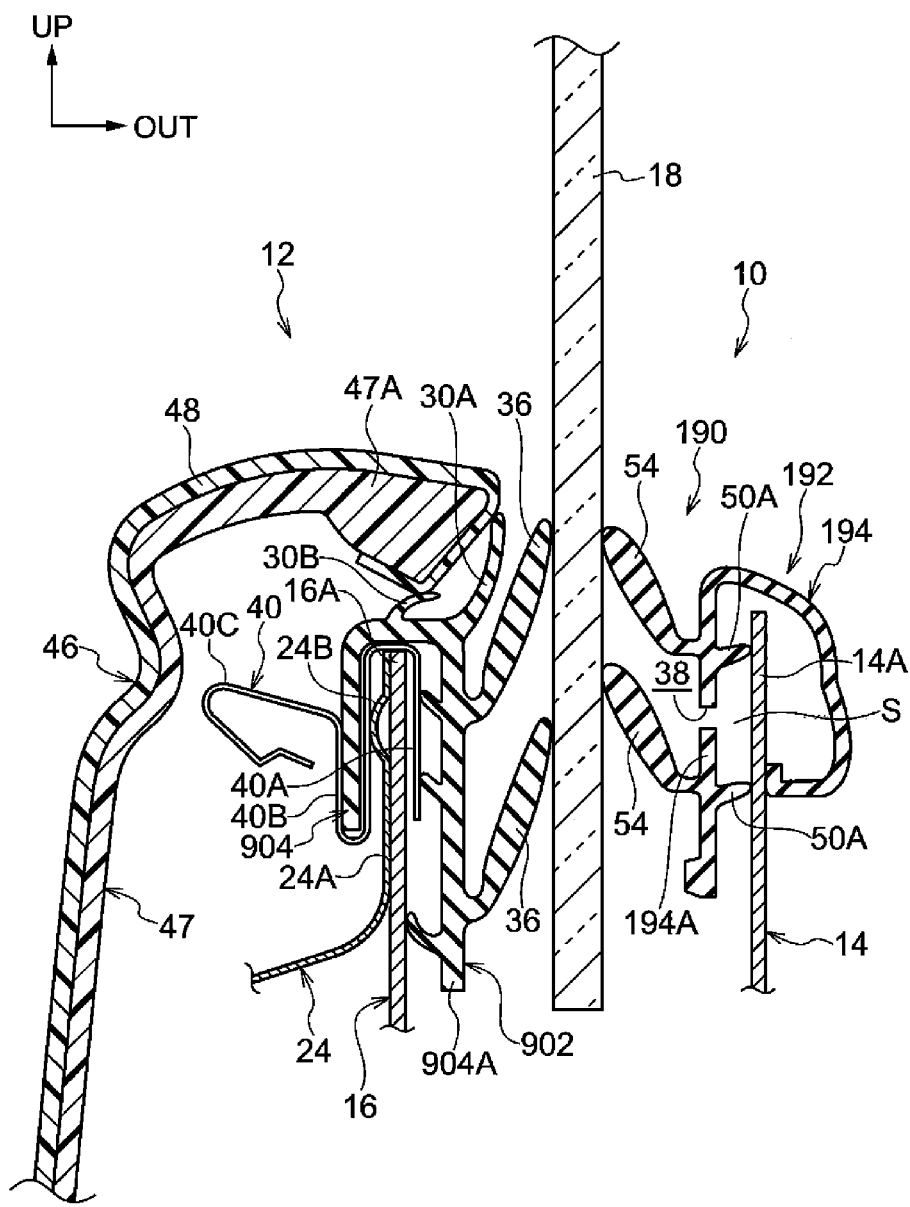
FIG. 22 is a vertical sectional view showing the structure of a vehicle door structure relating to a seventh embodiment.

As shown in FIG. 22, in a vehicle door structure 190, a belt molding 192 that serves as an example of a sealing member is fixed by plural clips or the like to the upper edge portion 14A of the door outer panel 14. The belt molding 192 has a mounting portion 194 that opens toward the vehicle lower side and is fit-in at the upper edge portion 14A of the door outer panel 14, and the two sealing lips 54 that project-out toward the door glass 18 side from a vertical wall 194A at the vehicle transverse direction inner side that structures the mounting portion 194. The distal end portions of the two sealing lips 54 are directed toward the vehicle diagonally upper side with respect to the wall surface of the vertical wall 194A. The through-holes 38 are formed in the vertical wall 194A between the two sealing lips 54. In the present embodiment, as seen from the vehicle side surface, the through-holes 38 are provided in a vicinity of the two sealing lips 54, at a position that overlaps with the distal end portion of the sealing lip 54 at the lower side. The two projecting pieces 50A that abut the door outer panel 14 are formed at the belt molding 192 at the upper side and the lower side of the through-holes 38 at the vehicle outer side surface of the vertical wall 194A. Due thereto, the closed space S is formed at the rear (the side opposite the door glass 18) of the through-holes 38. Note that the inner weatherstrip 902 that is the same as that of the vehicle door structure 900 of the comparative example is used.

In this vehicle door structure 190, the closed space S is formed at the rear of the through-holes 38 of the vertical wall 194A, by the wall body that is structured by the vertical wall 194A and the upper and lower projecting pieces 50A and the upper edge portion 14A of the door outer panel 14. Due thereto, a spring-mass system, in which the air at the through-hole 38 portion is a mass and the closed space S at the rear of the through-hole 38 is a spring, is structured, and sound of a specific frequency can be reduced. Therefore, the effect of insulating sounds that penetrate from the vehicle exterior into the vehicle cabin can be improved.

Figure 24:
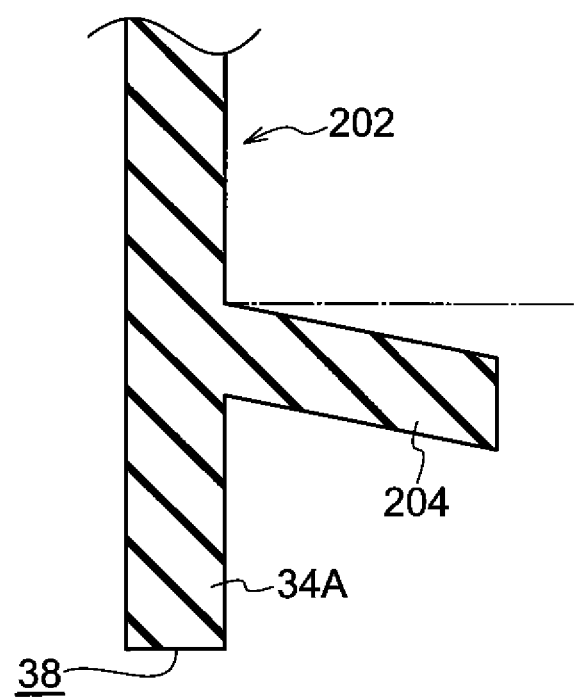
FIG. 24 is an enlarged vertical sectional view showing a canopy above the through-hole of an inner weatherstrip that is used in the structure of the vehicle door structure shown in FIG. 23.
Figure 25:
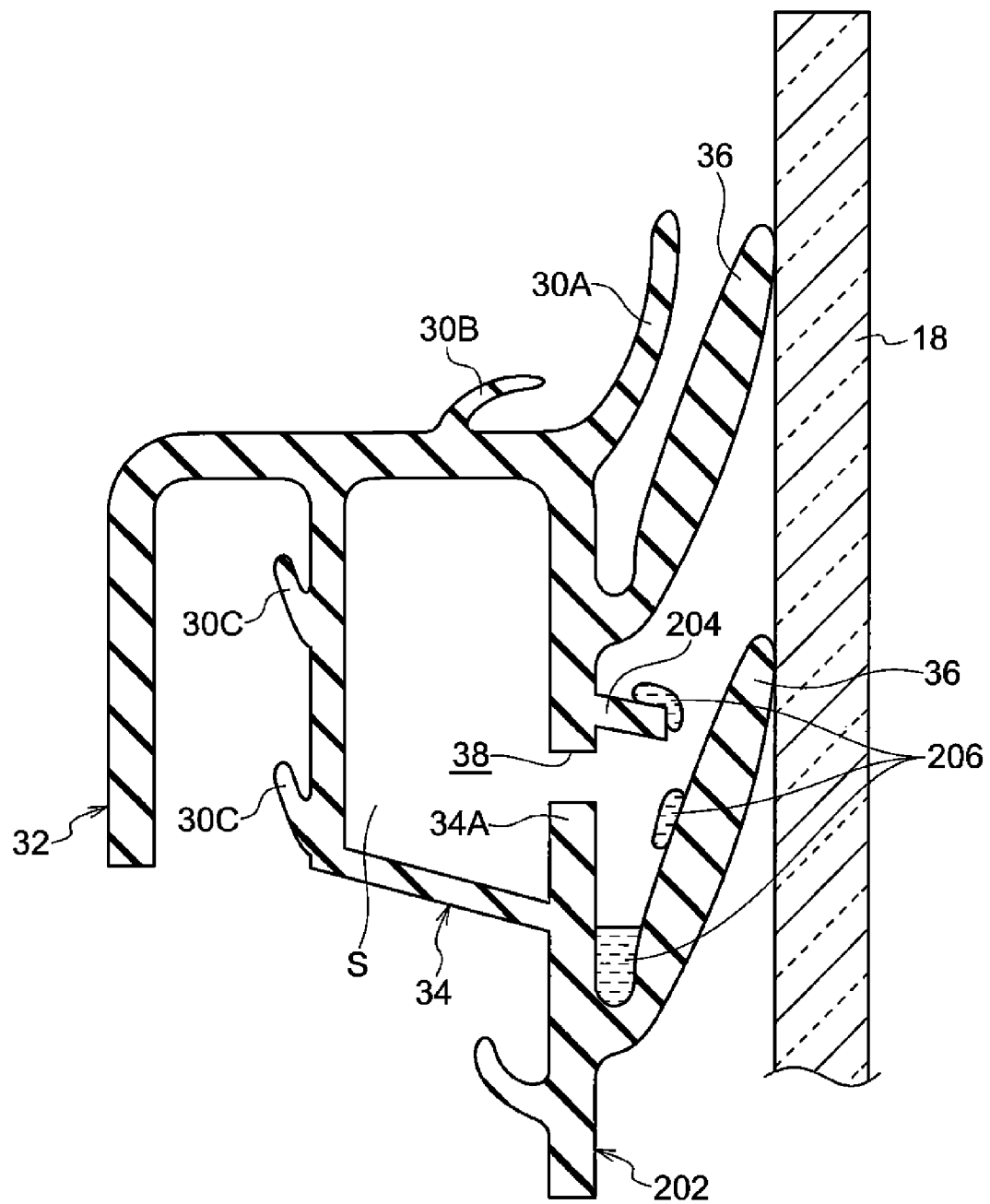
FIG. 25 is a vertical sectional view showing a state in which water has been transmitted into a wall from above the inner weatherstrip that is used in the structure of the vehicle door structure shown in FIG. 23.

An eighth embodiment of the vehicle door structure relating to the present invention is described next by using FIG. 23 through FIG. 25. Note that the same structural portions as the above-described first through seventh embodiments are denoted by the same numbers, and description thereof is omitted.

Figure 23:
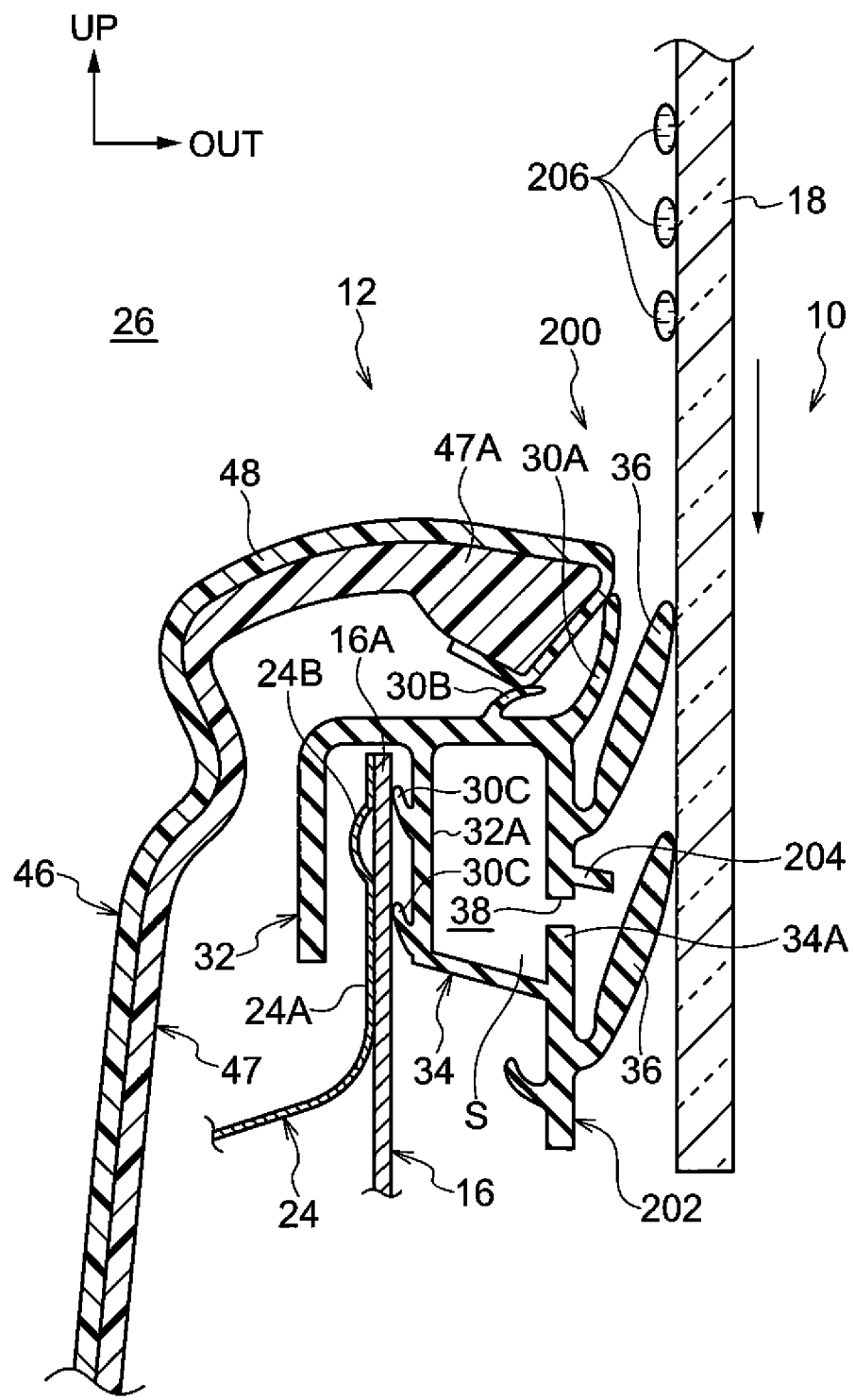
FIG. 23 is a vertical sectional view showing the structure of a vehicle door structure relating to an eighth embodiment.

As shown in FIG. 23, at an inner weatherstrip 202 to which a vehicle door structure 200 is applied, the through-holes 38, that are formed between the two sealing lips 36 at the vertical wall 34A that faces the door glass 18, and a canopy 204, that projects-out toward the vehicle transverse direction outer side from the vertical wall 34A at the upper side of the through-holes 38, are provided. As shown in FIG. 24, the canopy 204 is formed so as to be inclined slightly toward the vehicle lower side with respect to the outer wall surface of the vertical wall 34A.

As shown in FIG. 23, when the door glass 18 is lowered in the direction of the arrow, there is the possibility that water droplets 206, that are generated by condensation at the wall surface at the vehicle cabin side of the door glass 18, will enter in from between the sealing lip 36 at the upper side and the door glass 18 and will slide along the lower surface of the sealing lip 36 at the upper side. At this time, as shown in FIG. 25, the canopy 204 is provided at the upper side of the through-holes 38, and therefore, the water droplets 206, that have flowed along the lower surface of the sealing lip 36, flow on the upper surface of the canopy 204, and further, the water droplets 206 drop-off from the distal end of the canopy 204 onto the sealing lip 36 at the lower side, and collect between this sealing lip 36 and the vertical wall 34A. Thus, the water droplets 206 flowing into the through-holes 38 from the vertical wall 34A and collecting in the closed space S at the interior of the wall body 34 can be impeded.

Note that, in the first through the eighth embodiments, the plural through-holes 38 that are formed in the vertical wall that faces the door glass 18 are made to be circular shapes of substantially the same size (see FIG. 3). However, the plural through-holes (openings) may be made to be different sizes. Because the frequency at which the sound reducing effect appears is determined by the size of the through-holes and the volume of the closed space, there may be a structure in which the size of the plural through-holes is varied in plural stages (e.g., three stages that are large, medium, small) in order to reduce sounds of different frequencies.

Further, although the through-holes (openings) are made to be circular shapes, they may be made to be another shape such as triangular, quadrangular, polygonal, or the like. Note that, although the shape of the through-holes does not matter, in terms of manufacturing, circular is preferable in order to open the through-holes in the trim.

Further, because the frequency at which the sound reducing effect appears is determined by the size of the through-holes (openings) and the volume of the closed space, the shape of the wall body that forms the closed space at the rear of the through-holes is not particularly limited, and may be spherical or a polygonal body or the like for example. In a case in which space in the vehicle door main body cannot be secured, there may be a structure in which the closed space is formed by connecting a duct from the through-holes of the vertical wall that faces the door glass 18.

Note that, in the above-described first through eighth embodiments, the vehicle door structure is provided at a front side door, but the present invention is not limited to the same and can be applied to another vehicle door such as a rear side door or the like.

The invention claimed is:

1. A vehicle door structure comprising:
   a door main body that supports a door glass such that the door glass can be raised and lowered;
   a sealing member that is disposed at an upper portion of the door main body, and that has a wall that is disposed further toward a vehicle inner side than an outer wall surface that structures an outermost wall of a vehicle outer side of the door main body and that is disposed between the door glass and an upper end portion of a door panel provided at the door main body and in which an opening is formed at a position facing the door glass, and a sealing lip that is elastically deformable and is disposed so as to project out from the wall and slidingly contact the door glass; and
   a wall body that is disposed further toward a vehicle inner side than the outer wall surface that structures the outermost wall of the vehicle outer side of the door main body, and that is disposed between the door glass and the upper end portion of the door panel provided at the door main body, and that, together with the wall, forms a closed space that communicates with the opening at a side of the wall opposite from the door glass,
   at least one partitioning wall that divides the closed space being provided at the wall body, and
   another opening being formed in the partitioning wall.

2. The vehicle door structure of claim 1, wherein
   the sealing member has at least two sealing lips that are disposed in parallel at vehicle upper and lower sides, and
   the opening is provided between the sealing lips that are adjacent.

3. The vehicle door structure of claim 1, wherein
   the sealing member is an inner weatherstrip that is fit-together with an upper end portion of a door inner panel that structures a vehicle inner side member of the door main body, and
   the wall body is molded integrally with the inner weatherstrip.

4. The vehicle door structure of claim 1, wherein a canopy, that projects out from the wall toward the door glass side and is inclined toward a vehicle lower side from the wall in a projecting-out direction, is provided at an upper portion, in a vehicle vertical direction, of the opening at the wall.

* * * * *